United States Patent
Venkatasubramanian et al.

(10) Patent No.: US 10,474,442 B2
(45) Date of Patent: Nov. 12, 2019

(54) METHODS AND APPARATUS TO PERFORM REGION FORMATION FOR A DYNAMIC BINARY TRANSLATION PROCESSOR

(71) Applicant: Intel Corporation, Santa Clara, CA (US)

(72) Inventors: Girish Venkatasubramanian, Mountain View, CA (US); Tanima Dey, Campbell, CA (US); Dasarath Weeratunge, San Jose, CA (US); Cristiano Pereira, Groveland, CA (US); Jose Baiocchi Paredes, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 31 days.

(21) Appl. No.: 15/721,456

(22) Filed: Sep. 29, 2017

(65) Prior Publication Data

US 2019/0102150 A1    Apr. 4, 2019

(51) Int. Cl.
*G06F 9/30* (2018.01)
*G06F 8/41* (2018.01)

(52) U.S. Cl.
CPC ............ *G06F 8/41* (2013.01); *G06F 9/30065* (2013.01)

(58) Field of Classification Search
None
See application file for complete search history.

(56) References Cited

U.S. PATENT DOCUMENTS

| | | | | |
|---|---|---|---|---|
| 6,463,582 B1 * | 10/2002 | Lethin | ................. | G06F 9/45504 717/138 |
| 2003/0088860 A1 * | 5/2003 | Wang | ..................... | G06F 8/443 717/153 |
| 2004/0221278 A1 * | 11/2004 | Dankel | ............... | G06F 9/45516 717/139 |
| 2004/0221280 A1 * | 11/2004 | Bolton | ................. | G06F 8/4435 717/151 |

(Continued)

OTHER PUBLICATIONS

Wu et al., "The Accuracy of Initial Prediction in Two-Phase Dynamic Binary Translators," IEEE Proceedings of the International Symposium on Code Generation and Optimization, Mar. 20-24, 2004, 12 pages.

(Continued)

*Primary Examiner* — Corey S Faherty
(74) *Attorney, Agent, or Firm* — Hanley, Flight & Zimmerman, LLC

(57) ABSTRACT

Methods, apparatus, systems and articles of manufacture to perform region formation for usage by a dynamic binary translation are disclosed. An example apparatus includes an initial region former to form an initial region starting at a first block of hot code of a control flow graph. The initial region former also adds blocks of hot code lying on a first hottest path of the control flow graph. A region extender extends the initial region to form an extended region including the initial region. The extended region begins at a hottest exit of the initial region and includes blocks of hot code lying on a second hottest path until one of a threshold path length has been satisfied or a back edge of the control flow graph is added to the extended region. A region pruner prunes the remove all loop nests except a selected loop nest which forms a final region.

30 Claims, 16 Drawing Sheets

(56) References Cited

U.S. PATENT DOCUMENTS

2011/0066829 A1* 3/2011 Tye ...................... G06F 8/4441
                                                        712/226
2018/0268130 A1* 9/2018 Ghosh ................... G06F 21/53

OTHER PUBLICATIONS

Bala et al., "Transparent Dynamic Optimization," Hewlett Packard, Jun. 1999, 18 pages.

Dehnert et al., "The Transmeta Code Morphing (TM) Software: Using Speculation, Recovery, and Adaptive Retranslation to Address Real-Life Challenges," IEEE/ACM International Symposium on Code Generation and Optimization, Mar. 27-29, 2003, 10 pages.

* cited by examiner

US 10,474,442 B2

METHODS AND APPARATUS TO PERFORM REGION FORMATION FOR A DYNAMIC BINARY TRANSLATION PROCESSOR

FIELD OF THE DISCLOSURE

This disclosure relates generally to dynamic binary translation processors and, more particularly, to methods and apparatus to perform region formation in a dynamic binary translation processor.

BACKGROUND

Binary translation is the process of translating/converting code to a functionally equivalent version. Many types of binary translation also include attempts to optimize the translated code to thereby realize improved performance when the translated code is executed. Binary translation includes selecting portions of the code to be translated as a single unit. The portions, together, are referred to as a "region." The improvement in performance depends, at least in part, on the manner in which portions of the code are selected for inclusion in the region to be translated.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
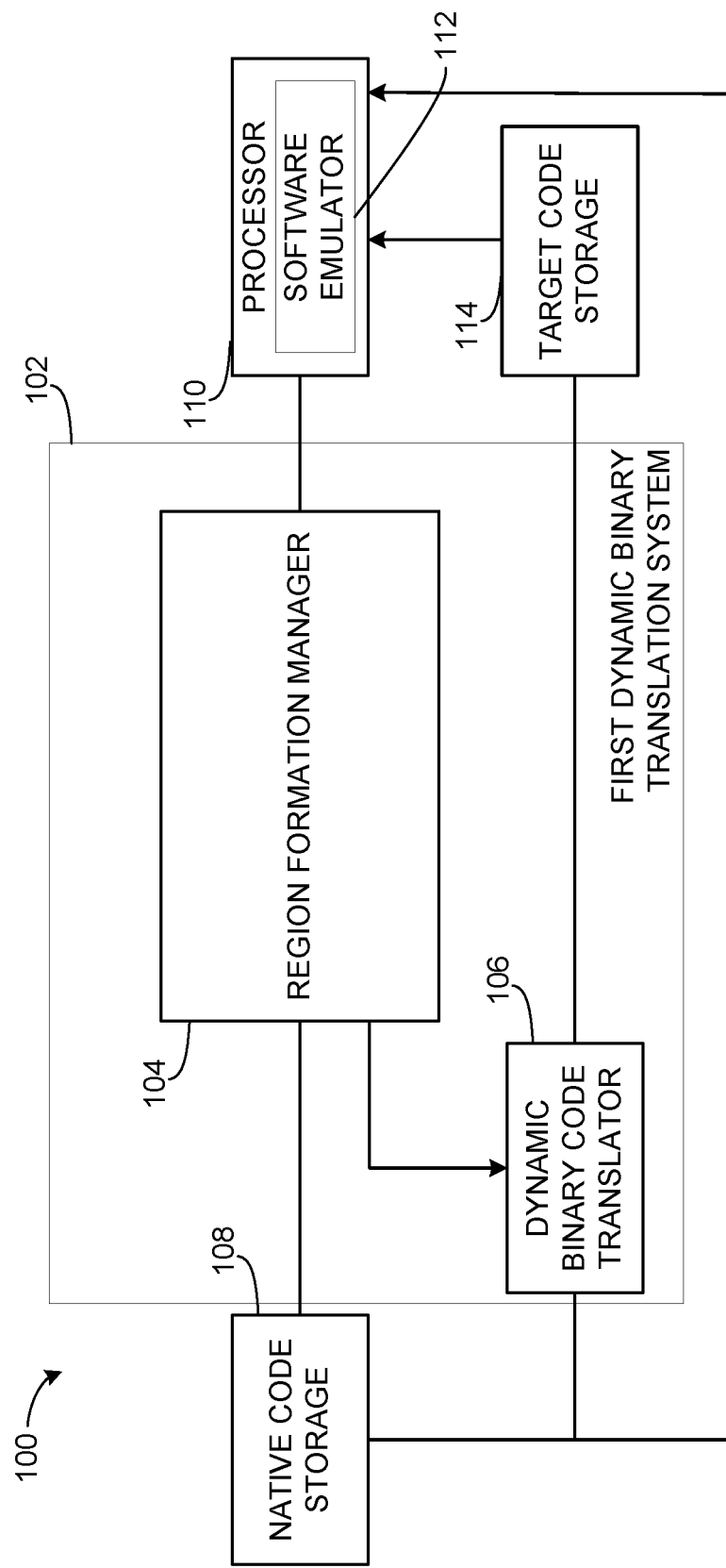
FIG. 1 is a block diagram of an example implementation of a first example computing system having an example first dynamic binary translation system that includes an example region formation manager.

Dynamic binary translators are used to translate code (machine-readable instructions) from a first instruction set (also referred to as a "native instruction set") to a second instruction set (also referred to as a "target instruction set") for execution on a processor or a hardware accelerator. In some examples, the dynamic binary translator not only translates the code but also attempts to optimize the translated code. Optimization refers to the process of attempting to fine tune the code during the translation process in a manner that results in the translated code executing more efficiently than the original, native (untranslated) code. Some dynamic binary translators perform code translation by translating sequences (also referred to as blocks of instructions or instruction blocks) of the code and then executing the translations of code. The translations of code are referred to herein as "translations." The results of executing the translations of code are cached and the results are used when the block of code is to be re-executed. Some dynamic binary translators capable of performing optimization procedures, select regions of the code to be optimized. For example, sequences/blocks of instructions containing loops are often translated to execute as a single unit which typically reduces the number of clock cycles required to execute the code.

Region formation is the process of selecting blocks/sequences of code instructions that are to be translated as a single unit thereby forming a single translation. The performance benefits to be gained by executing the translated code (versus the untranslated code) depends on how well the translated code is optimized which, in turn, depends, at least in part, on region formation. Some conventional methods to perform region formation focus on collecting code blocks that are equally hot or almost equally hot into a single region while excluding code blocks that are cold. Hot code blocks (also referred to as "hot code") are blocks of code that execute for a long period of time relative to other blocks of code. The code forming loops, which are typically iteratively executed, is often hot code. Such conventional methods of region formation also focus on limiting the size of regions. Another conventional method emphasizes forming a region that includes a "hyper block." A hyper block includes chunks of code that, when represented as a control flow graph, has a single point of entry and multiple points of exit. Yet another conventional method for performing region formation involves using an observed execution trace to construct a region. However, none of the foregoing methods make an attempt to ensure that multiple inner loops of an outer loop (e.g., a loop nest) within the code are captured in a single region instead of being fragmented into multiple regions. Unfortunately, optimizations, such as loop unrolling and/or parallelization, are not possible when region formation results in a loop (or loop nest) being fragmented into multiple regions. As a result, the foregoing methods to perform region formation often decrease the performance benefits that would otherwise be achieved if such loops (and/or loop nests) were captured in a single region formation.

FIG. 1 is a block diagram of an example implementation of a first example computing system 100 having an example first dynamic binary translation system 102. The first dynamic binary translation system 102 includes an example region formation manager 104 and an example dynamic binary code translator 106. In the example of FIG. 1, an example native code storage 108 stores a computer program to be translated by the first dynamic binary translation system 102. The dynamic binary code translator 106 of the first dynamic binary translation system 102 translates the computer program from a native instruction set to a target instruction set using any dynamic binary translation technique. In some examples, the first dynamic binary translation system 102 translates the code in a manner that includes performing any of a number of optimization techniques such as parallelization and loop unrolling. The translated computer program and the untranslated computer program have equivalent functionality when executed by an example processor 110.

In some examples, the hardware of the example processor 110 is designed to execute the target instruction set and the processor 110 uses an example software emulator 112 to execute the native instruction set. In some examples, the processor 110, while running the example software emulator 112, begins executing the native code stored in the example native code storage 108. The example region formation manager 104 monitors the execution of the native code by the software emulator 112 of the processor 110 and identifies sets/blocks of instructions to be placed into a region. The sets/blocks of instructions to be placed into the region are supplied by the region formation manager 104 to the example dynamic binary translator 106 for translation as a single unit (to result in a single translation). The dynamic binary translator 106 stores the translated code in an example target code storage 114 for execution by the processor 110. As described above, the code translation performed by the first dynamic binary translation system includes optimizations that improve the processing speed and efficiency achieved when the target code is executed by the processor 110.

Figure 2:
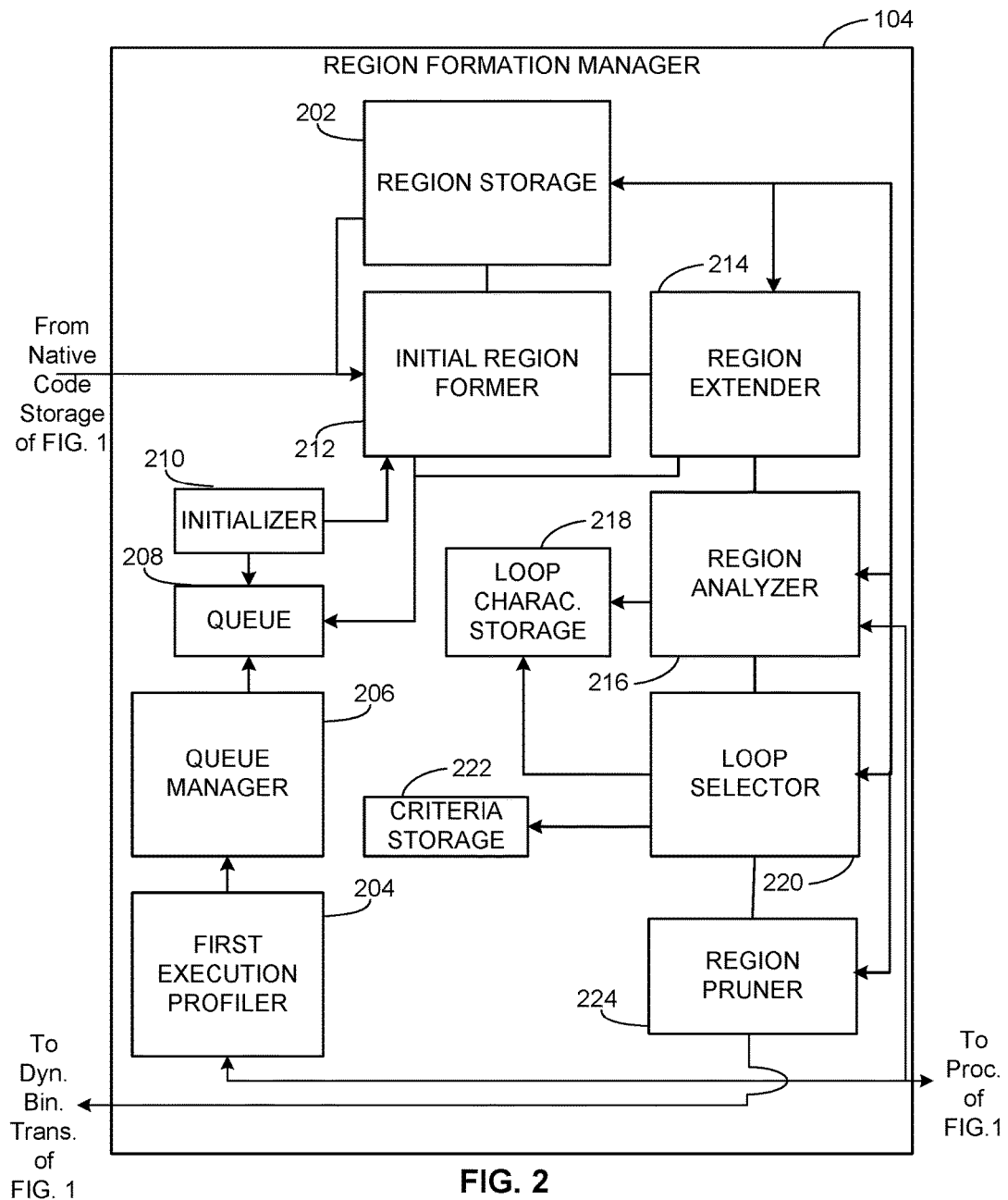
FIG. 2 is block diagram of an example implementation of the example region formation manager of FIG. 1.

FIG. 2 is block diagram of an example implementation of the example region formation manager 104 of FIG. 1. In some examples, the region formation manager 104 includes an example region storage 202, an example first execution profiler 204, an example queue manager 206, an example queue 208, an example initializer 210, an example initial region former 212, an example region extender 214, an example region analyzer 216, an example loop characteristic storage 218, an example loop selector 220, an example criteria storage 222, and an example region pruner 224.

In some examples, the example software emulator 112 of the example processor 110 executes the native code stored in the native code storage 108 (see FIG. 1). As the native code is being executed, the example first execution profiler 204 monitors the execution of the native code. When the first execution profiler 204 determines an instruction or block of instructions/code is "hot" (e.g., taking a long time to execute, executed the most frequently, etc.), the first execution profiler 204 notifies the example queue manager 206. The queue manager 206 responds by adding information that can be used to identify the block of hot code to the example queue 208. In some examples, the information identifying the block of hot code includes an IP address of the starting instruction of the block of hot code. In some examples, the queue manager 206 also places contextual information about the block of hot code into the queue 208 such as a thread identifier, an execution count, a branch identifier identifying a branch statement that leads to the block of hot code, etc. In some examples, the queue manager 208 only adds blocks of hot code to the queue that are a target of a backward branch (e.g., the IP address of the branching statement that leads to the block of hot code is higher than the IP address of the block of hot code).

In some examples, aspects of the example queue manager 206 and/or the example queue 208 are implemented as one or more hardware structures or in-memory structures. In some examples, the first execution profiler 204 is implemented as a hardware based profiler and raises an interrupt when a block of code is determined to be hot. In some such examples, the queue manager 206 is implemented with software (e.g., as an interrupt service routine) and responds to the interrupt by adding information identifying the block of hot code to the queue 208. In some examples, the first execution profiler 204 and the queue manager 206 are implemented as a software based profiler and the queue 208 is implemented with hardware. In some such examples, the execution of one or more special instructions causes a block of hot code to be added to the queue 208. In some examples, the first execution profiler 204, the queue manager 206 and the queue 208 are all implemented in hardware. In some examples, the first execution profiler 204, the queue manager 206 and the queue 208 are all implemented in software without any special instructions.

In some examples, the example queue 208 is implemented as a least-recently used (LRU) queue having a limited capacity that discards the least recently used block of hot code first (when capacity is reached). In some examples, when a block of hot code that has been identified for addition to the queue 208 by the first execution profiler 204 already resides in the queue 208, the queue manager 206 causes the block of hot code to be moved to the head of the queue 208 and no new block of hot code is added to the queue 208. In this way, the identified block is considered recently used and will not be discarded before other, less recently used blocks are discarded.

Referring still to FIG. 2, the example initializer monitors 210 the length of the example queue 208. When the length of the queue 208 reaches a threshold queue length value, the initializer 210 generates a trigger at the example initial region former 212. In some examples, the threshold queue length value that will cause a trigger to be generated is greater than one. Thus, unlike conventional region formation methods that immediately begin forming a region based on the identification of a single block of hot code, the region formation manager 110 operates after a threshold number of blocks of hot code have been detected. Delaying region formation until a threshold number of blocks of hot code are added to the queue 208 ensures that profile information about a relatively large part of the native, untranslated code can be collected. As loop nests tend to span larger numbers of code blocks than only innermost loops, obtaining profile information about a greater number of code blocks results in a richer set of data that often includes information about loop branches. Obtaining profile information about a greater number of code blocks also reduces the possibility that region growth is unnecessarily truncated for lack of a sufficient amount of profile information.

Referring still to FIG. 2, in response to the trigger generated by the example initializer 210, the example initial region former 212 begins forming an initial region. In some examples, the initial region former 212 begins forming the initial region by selecting a first block of hot code from the queue 208 to be included in the initial region. As described above, each block of hot code can include one or more native code instructions. In some examples, the selected, first block of hot code corresponds to the last block of hot code that was added to the queue 208. The initial region former 212 then grows the initial region by generating a control flow graph of the code being executed. In some examples, the initial region former 212 generates a control flow graph by fetching and decoding the native instructions included in the block of hot code (e.g., performs a static decoding technique). In some examples, the initial region former 212 determines that the first block of hot code leads to one or more other blocks of code. In some such examples, the initial region former 212 determines which of the blocks of hot code is the hottest block of hot code and then adds the hottest block of hot code to the initial region. In some examples, the initial region former 212 determines which of the blocks of hot code is the hottest based on profile information supplied by the first execution profiler 204. The initial region former 212 continues to grow the initial region in this manner (e.g., adding blocks lying along the hottest path) until the initial region former 212 determines that the other blocks of code are not hot enough to be added to the initial region or until the path leads to a next block of hot code that was previously added to the initial region.

Figure 3:
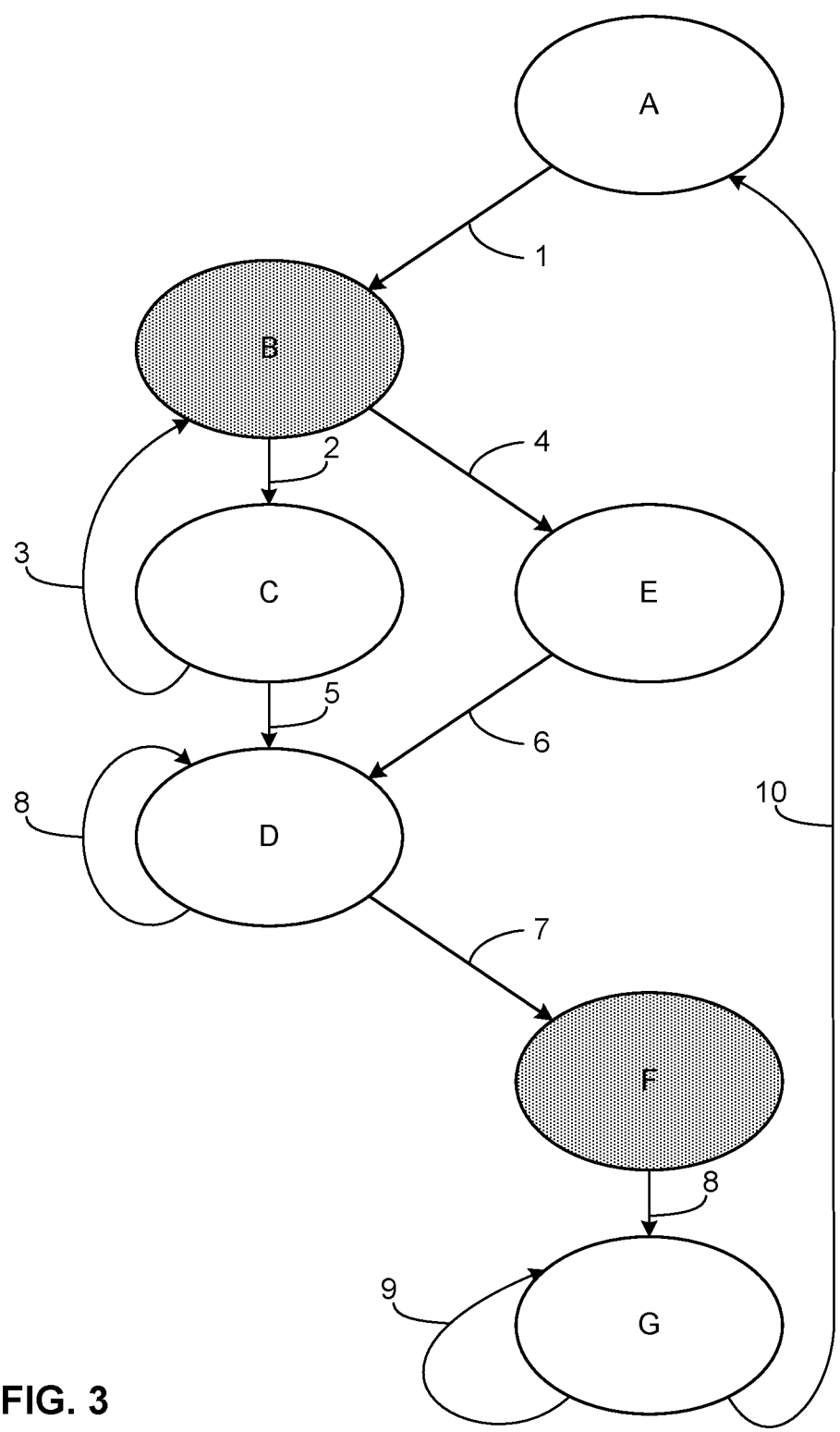
FIG. 3 is an example control flow graph illustrating the operation of the example region formation manager of FIG. 2.

FIG. 3 is an example control flow graph 300 and includes example blocks of code (Block A, Block B, Block C, Block D, Block E, Block F, Block G) connected by example paths (Path 1, Path 2, Path 3, Path 4, Path 5, Path 6, Path 7, Path 8, Path 9, and Path 10). The blocks (Blocks A-G) represent blocks of instructions included in the code to be translated and the paths (Paths 1-10) represent directions of flow between the blocks of code (Blocks A-G), when executed by the example processor 106 (see FIG. 1). In some examples, the Blocks A-G are identifiable using IP addresses that correspond to the first instruction of each such block. In the control flow graph 300, the Block A is connected to the Block B by the Path 1, thereby indicating that after the instructions of the Block A are executed, the processor 106 proceeds to execute the instructions of the Block B. The Block B is coupled to the Block C by the Path 2, and is also coupled to the Block E by the Path 4. Thus, after executing the instructions of the Block B, the processor 106 branches to execute either the instructions of the Block C or the Block E. The Block C is also connected back to the Block B by the Path 3 and is also connected to the Block D via the Path 5. Thus, after the instructions of the Block C are executed the processor 106, the processor branches to execute either the instructions of the Block B or the Block D. In addition to the Block C, the Block E is also coupled to the example Block D via the Path 6. The Block D loops back to itself by the Path 8. As a result, the instructions of the Block D can be executed after any of the instructions of the block E, the Block C, or the Block D. Additionally, the Block D is connected to the Block F by the Path 7. After the instructions of the Block D are executed, the processor 106 executes the instructions of the Block F or again executes the instructions of the Block D. The Block G is connected to itself by the Path 9 and is also connected to the Block A by the Path 10 such that after the instructions of the Block G are executed the processor 106 either re-executes the instructions of the Block G, or executes the instructions of the Block A.

In FIG. 3, the Blocks B and F are shaded to indicate that both Block B and Block F are blocks of hot code. As described above, hot code is used to refer to as code that executes over many clock cycles as compared to the other code blocks or is frequently re-executed as compared to other code blocks. In contrast, the blocks of cold code (Block A, Block C, Block D, Block E, and Block G) may be executed infrequently and/or using comparatively fewer clock cycles.

Referring now to FIG. 2 and FIG. 3, when the Block B was the last block of code added to the example queue 208, the example initial region former 212, in response to the trigger, adds the example Block B to the initial region. As the last block of code added to the queue 208, the Block B is the most recently executed block of code included in the queue 208. In addition, the initial region former 212 determines that the Block B leads to the example Block C and the example Block E. In this example, the initial region former 212 determines that the hottest path from the Block B leads to the Block C and proceeds to add the Block C to the initial region. In addition, the initial region former 212 determines that the Block D is not hot enough to add to the initial region and thus, terminates the initial region at the Block C. In some examples, the initial region former 212 stores information identifying the initial region (e.g., the Block B and the Block C) in the region storage 202. Using a static decoding approach to support region formation instead of relying on observed traces (as is often done in conventional region formation methods), the region formation manager 212 disclosed herein is able to explore colder paths of code which may not have been executed in the window during which a trace was collected.

Referring to FIG. 2, after the initial region is formed, the example initial region former 212 notifies the example region extender 214 that the initial region is ready to be extended. The region extender 214 responds by extending the initial region to form an extended region that includes the initial region. In some examples, the region extender 214 accesses the region storage 202 to obtain the initial region (e.g., to determine the blocks of code included in the initial region and the paths by which the blocks of code are connected). The region extender 214 analyzes a set of exits of the initial region and determines which of the exits is the hottest exit. The region extender 214 then evaluates blocks of code that are reachable via the hottest exit and, based on the outcome of the evaluation, adds a path including the blocks of code reachable via the hottest exit to the extended region. In some examples, the evaluation includes determining whether a path extending from the exit being evaluated: 1) reaches a block of hot code already connected to the initial region (or the extended region if the initial region has already been extended), or 2) reaches a block of hot code within a threshold number of blocks of code (even if blocks of code intervening between the exit and the block of hot code are blocks of cold code). When making this evaluation, the region extender 214 ignores any back edges included in the blocks of code (e.g., Block D of FIG. 3 has a back edge).

Ignoring back edges helps the region formation manager 110 to capture outer loops when there are a number of inner loops in the body of the outer loop but only some of the blocks of code containing inner loop headers are present in the queue 208. Referring also to FIG. 3, the example control flow graph 300 contains three loop headers, the example Block B, the example Block D and the example Block F, but only the Block B and the Block F are present in the queue 208. As a result, if back edges were followed (not ignored), there would be no acyclic path starting from the Block C that leads to the Block F such that expansion along the Path 5 would be impossible.

If the path being evaluated meets either of the two criteria provided above, the example region extender 214 adds the blocks of code that lie on a path starting at the hottest exit to the extended region. Referring again to the example control flow graph 300 of FIG. 3, when determining whether the path extending from the hottest exit (e.g., Block C) meets the criteria above, the path is followed from Block C to Block D which is a block of cold code. However, the Block D reaches the Block F which is a block of hot code. Assuming the threshold (e.g., maximum) number of blocks that can lie in a path between the exit (e.g., the Block C) and a block of hot code (e.g., the Block F) is two blocks, the path from the Block C to the Block F satisfies the evaluation criteria such that the path extending from the hottest exit (Block C) is to be added by the region extender 214 to the initial region to thereby form the extended region.

Referring to FIGS. 2 and 3, the example region extender 214 next determines which of the blocks of code lying on a hottest path from the hottest exit (e.g., Block C) are to be added to the initial region. In some examples, the region extender 214 adds the blocks of code along the hottest path extending from the exit (e.g., the example Block C) until a threshold number of blocks of code have been added or until a block associated with a back edge has been added. When processing the example control flow graph 300 of FIG. 3, the region extender 214 begins at the block having the hottest exit (Block C) and proceeds to add the next block (e.g., the example Block D) until a threshold number of blocks is reached or a block with a back edge is reached. After adding the Block D, the region extender 214 terminates the path because the Block D is associated with a back edge. Thus, even though the path extending from the Block C and including the Block D was added to the extended region due to the ability to reach the example Block F from the Block C, the path that is added is limited to the Block D because the Block D has a back edge.

After adding the example Block D to the initial region to form the extended region, the example region extender 214 continues to grow the extended region by iteratively selecting a hottest exit from among all exits of the extended region, determining whether to add a path associated with the hottest exits and then adding paths based on the determinations. When a last of the hottest exits have been evaluated, the region extender 214 is finished forming the extended region. In some examples, the region extender 214 stores information identifying the blocks of code included in the extended region as well as any other desired information in the example region storage 202.

Referring to FIG. 2, after the example region extender 214 finishes growing the extended region, the example region analyzer 216 analyzes the example extended region stored in the example region storage 202. In some examples, the analyzing performed by the region analyzer 216 includes identifying all loops (and loop nests) included in the extended region and determining characteristics (metrics of interest) of each loop. In some examples, the region analyzer 216 stores the information identifying the loops and the loop characteristics in the example characteristics storage 218. In some examples, the characteristics can include a number of instructions included in the loop nests, information identifying blocks of code included in the loop nests, the depth of the loop nests, whether the loop nests are reducible, etc. In some examples, the region analyzer 216 obtains the characteristics from the example first execution profiler 204.

When the loop nest characteristics are stored in the example characteristic storage 218, the example loop selector 210 selects one of the loop nests based on the stored characteristics. In some examples, the loop selector 210 uses a loop nest criteria stored in the criteria storage 222 to select one of the loop nests. In some such examples, the loop selector 220 examines the loop nest characteristics stored in the loop characteristics storage 218 and determines which of the loop nests meets the criteria. In some examples, the criteria specifies that 1) the selected loop nest is to include fewer than a threshold number of instructions and/or blocks, 2) the selected loop nest is to have a nest depth that is less than or equal to a threshold nest depth, and/or 3) the selected loop nest is to be reducible, etc. In some examples, the region formation is performed so that processing of the blocks of code included in the region can be offloaded to a hardware accelerator. In some such examples, the criteria can include any constraints imposed by virtue of the architecture of the hardware accelerator. In some examples, the architecture of the hardware accelerator may be unable to process loops having more than a threshold number of certain types of instructions. In some such examples, the limit on the number of such types of instructions can be added as a criteria to be met when selecting a loop nest. In some examples, the loop selector 220 selects the largest loop nest that meets the criteria.

After the example loop selector 220 selects one of the loop nests, the loop selector 220 notifies the example region pruner 224 of the identity of the selected loop nest. The region pruner 224 uses the identity of the selected loop nest to prune all other loops/loop nests from the extended region. In some examples, the region pruner 224 also performs queue cleanup activities. Example queue cleanup activities can include: 1) removing, from the example queue 208, all blocks of hot code that are part of the selected loop nest, 2) purging, from the queue 208, all blocks of hot code regardless of whether the blocks of hot code are included in the selected loop nest, etc. In some examples, the region pruner 224 does not perform any queue cleanup activities such that the blocks of hot code contained in the queue 208 after the region formation process remain in the queue 208.

After the pruning is completed, the selected loop nest is the only remaining portion of the extended region and becomes a final region. In some examples, the example region pruner 224 causes information identifying the blocks of code included in the final region to be stored in the region storage 202. In addition, the region pruner 224 provides the information identifying the final region to the example dynamic binary translator 102 (see FIG. 1). The dynamic binary translator 102 translates the code included in the final region as a single unit. The resulting translated code is referred to herein as a "translation." In addition, the dynamic binary translator 102 causes the translation to be stored in the example target code storage 114 (see FIG. 1) for access and execution by the processor 110 and/or a hardware accelerator.

The example region formation manager 104 disclosed herein provides several advantages over conventional region formation tools including the ability to more comprehensively capture loop nests for translation as a single unit. To illustrate one or more of the advantages gained when using the region formation manager 104 disclosed herein over conventional methods, a strawman region former was modeled and the loop related metrics of Loop Coverage and High Residency Loop Coverage were obtained. The workloads used included a mix of benchmarks from suites representing a mix of client and server workloads. Additionally, the region formation manager 104 was modeled and similar loop metrics were obtained. The metric used to measure the ability of the region formers to capture loops (referred to as "loop coverage") was obtained for both models. Loop coverage is defined as the ratio of 1) the dynamic instructions from loops and loop nests that are captured in one region to 2) the total number of dynamic instructions executed. For example, if out of a workload of 10 million instructions, translated regions make up 5 million instructions, and, 3 million of the 5 million instructions are from loops, then the loop coverage is 3/10 (30%). A comparison of the loop coverage obtained using the strawman region former versus the region formation manager 104 indicates that an improvement of 20% is gained by using the region formation manager 104 disclosed herein. Improved coverage was gained as a result of the region formation manager's ability to: 1) accumulate a plurality of hot blocks in a queue (or pool) and trigger the region formation process/method after populating the queue/pool instead of immediately triggering a region formation process after the detection of each hot block; 2) employ a region extender to perform a secondary growth phase (in addition to the primary growth phase performed by the initial region former) to identify and grow cold paths (provided the identified cold paths lead to blocks of hot code), and/or 3) select a loop nest having characteristics that are superior to other loop nests and prune other loop nests from the final region.

Figure 4:
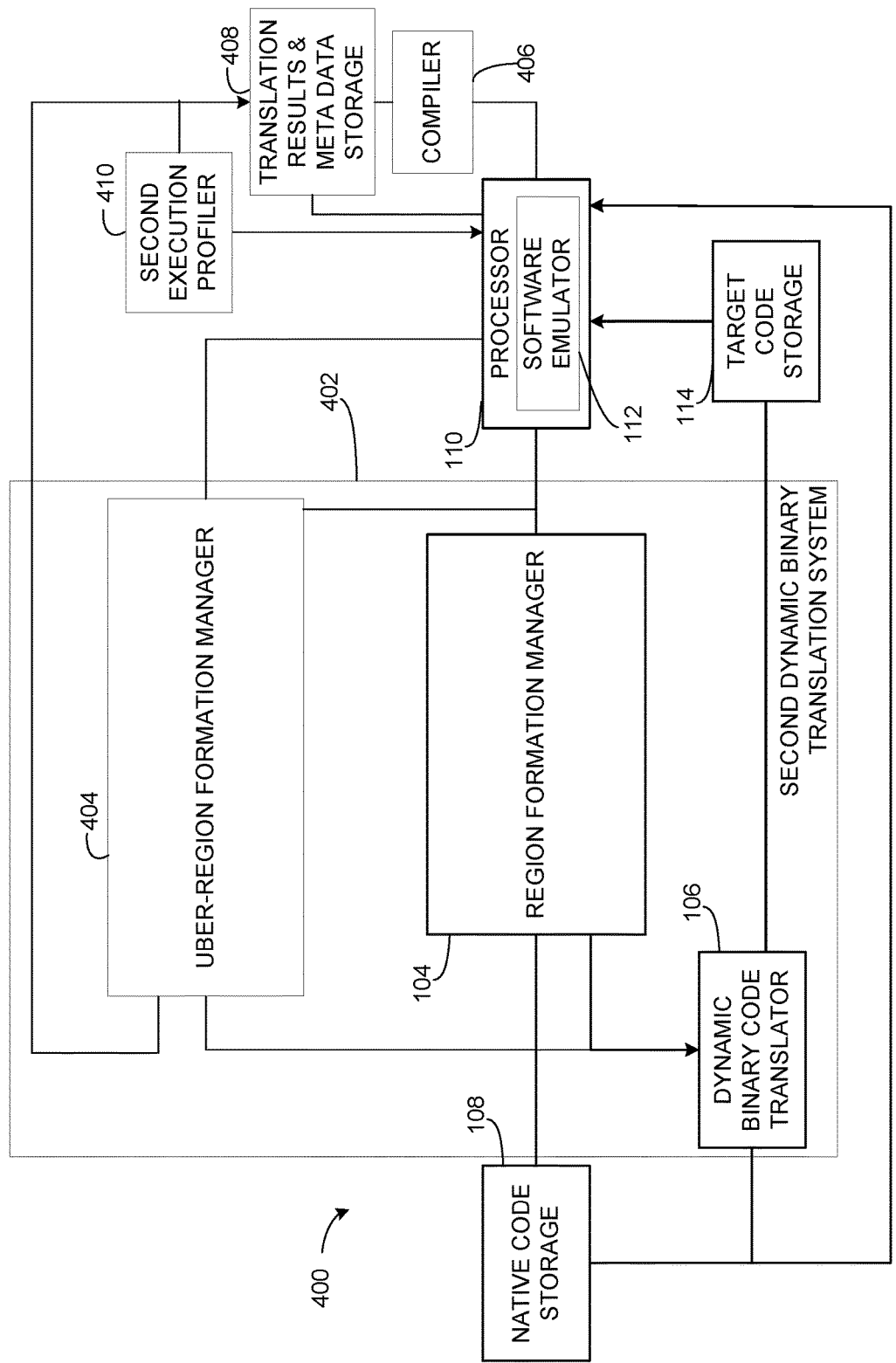
FIG. 4 is a block diagram of an example implementation of a second example computing system having an example second dynamic binary translation system that includes an example uber-region formation manager.

FIG. 4 is a block diagram of an example implementation of a second example computing system 400 having an example second dynamic binary translation system 402 that, in addition to the example region formation manager 104 and the example dynamic binary code translator 106 further includes an example uber-region formation manager 404. In the example of FIG. 4, the computer system 400 also includes the example native code storage 108, the example processor 110 that can execute the software emulator 112, the example target code storage 114, an example compiler 406, an example translation results and meta data storage 408, and an example second execution profiler 410. In some examples, the target code stored in the target code storage 114 includes blocks of translated native code (also referred to as translations). As described with respect to FIGS. 1-3, the translations are generated by the dynamic binary code translator 106 and at least some of the translations are generated based on regions formed by the region formation manager 104. In some examples, the processor 110 causes the compiler 406 to compile the translations. The compiler 406 causes the compiled translations to be placed in the translation results and metadata storage 408. The processor 110 then obtains the translation results from the translation results and metadata storage 408 for execution. In some examples, the compiler 406 and/or the second execution profiler 410 generate translation metadata corresponding to the translations as the translations are executed. The translation metadata is stored with the corresponding translations in the translation results and metadata storage 408. In some examples, the translation metadata can indicate a number of times that the corresponding translation is executed, a list of translations that exit to a translation, and a list of translations to which the translation exits, etc.

Figure 5:
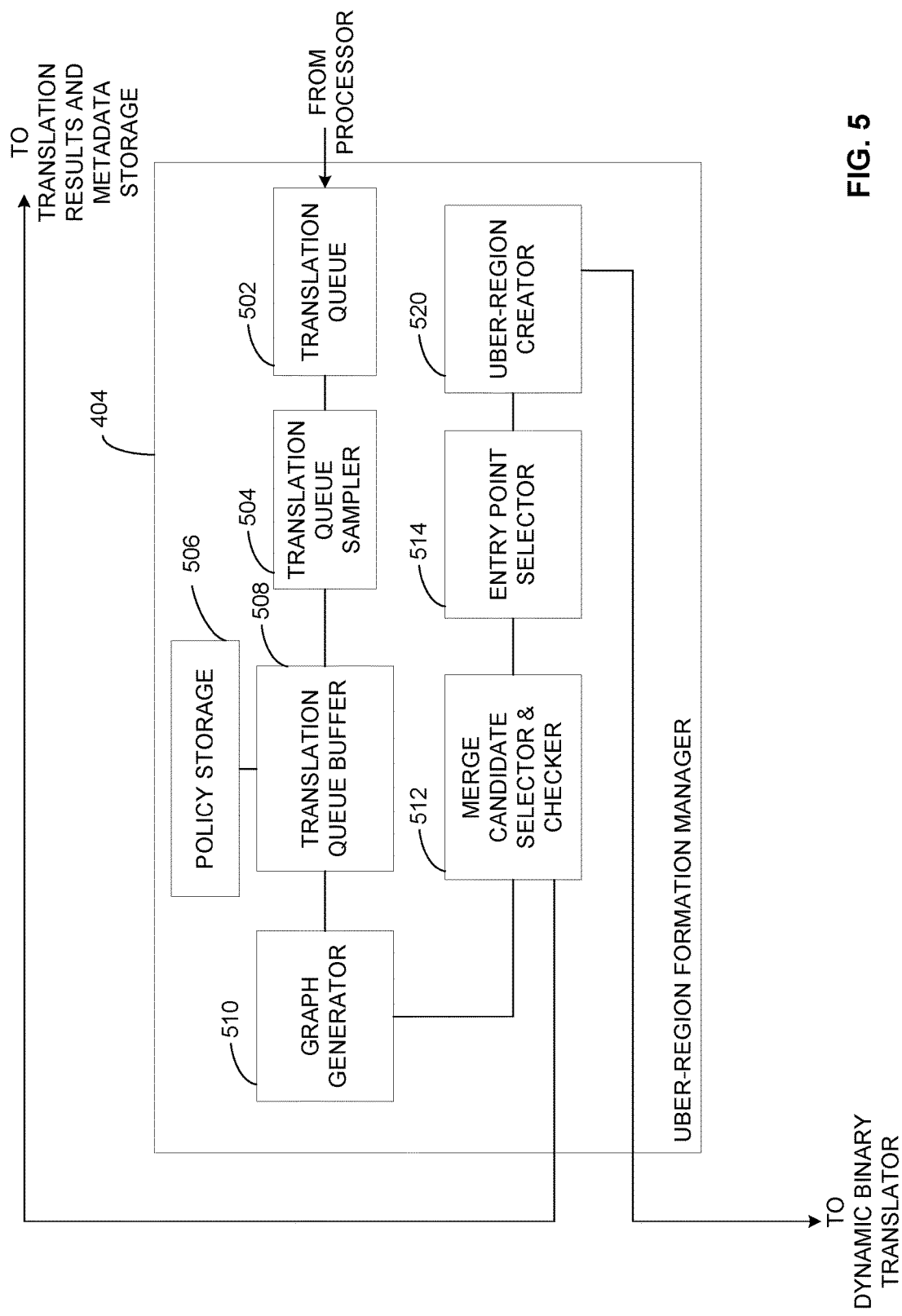
FIG. 5 is a block diagram of an example implementation of the example uber-region formation manager of FIG. 4.

FIG. 5 is a block diagram of an example implementation of the example uber-region formation manager 404 of FIG. 4. In some examples, the uber-region formation manager 404 includes an example translation queue 502, an example translation queue sampler 504, an example policy storage 506, an example translation queue buffer 508, an example graph generator 510, an example merge candidate selector and checker 512, an example entry point selector 514, and an example uber-region creator 516.

In some examples, the example translation queue 502, which can be implemented using a hardware, circular buffer HERE-queue, monitors execution of the translations by the example processor 110 (see FIG. 1). In some such examples, the translation queue 502 periodically interrupts the execution of the translations by the processor 110 and collects information about a translation being executed at the time of the interrupt (referred to as a "current translation"). In some examples, the collected information includes information identifying the current translation and further identifying a number of times that the current translation has been sampled by the translation queue 502. In some examples, the size of the translation queue 502 is configurable.

Referring still to FIG. 5, the example translation queue sampler 504 periodically reads the entire contents of the translation queue and records the sampled information contained therein as an array in the example translation queue buffer 508. As a result, the translation queue buffer 508 includes snapshots of information contained in the example translation queue 502. In some examples, the translation queue buffer 508 includes M×N entries, where M is the number of entries in the translation queue 502 and N is the number of snapshots saved for each of the translations included in the translation queue 502. In some examples, when a sampling interrupt occurs and the translation queue 502 determines that a sample count of the current translation satisfies a sample count threshold value, the current translation is eligible to be merged with other translations. In some examples, the sample count threshold value is statically defined and, in some examples, the sample count threshold value can be dynamically adjusted based on a recent execution of the translations and/or a policy stored in the example policy storage 506. The first merge-eligible translation is the translation having a sample count that exceeds the sample count threshold value and is also referred to herein as a "seed."

In some examples, when a seed has been identified by the example translation queue buffer 508 (e.g., a sampled, current translation meets a sample count threshold value), the example graph generator 510 builds a translation graph based on the contents of the translation queue buffer 508. In some examples, the translation graph includes a set of nodes that are coupled by edges. The nodes of the graph represent translations and an edge connecting two nodes (e.g., node A and node B) indicates that one of the corresponding translations is reachable by the other corresponding translations (e.g., the translation of the node A, when executed, at least sometimes branches to the translation of the node B). In some examples, the graph generator 510 begins building the graph by representing the seed as a first node of the graph, finding entries in the translation queue buffer 508 that contain the seed, and using the entries to determine edges between the seed and other translations.

Figure 6:
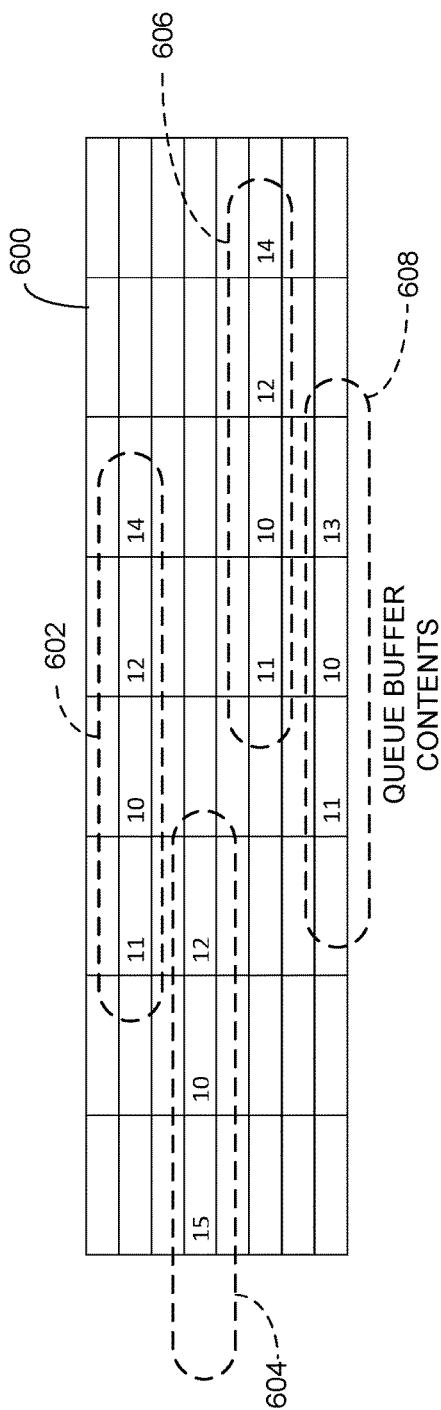
FIG. 6 is a table illustrating example contents of an example queue buffer included in the uber-region formation manager of FIG. 4.

FIG. 6 includes example contents of the example translation queue buffer 508. In the example of FIG. 6, the example contents of the translation queue buffer 508 include four example entries (the example first Entry 602, the example second Entry 604, the example third Entry 606, and the example fourth Entry 608). The entries include information about the order of execution of example translations (the example Translation 10, the example Translation 11, the example Translation 12, the example Translation 13, the example Translation 14, and the example Translation 15).

Figure 7:
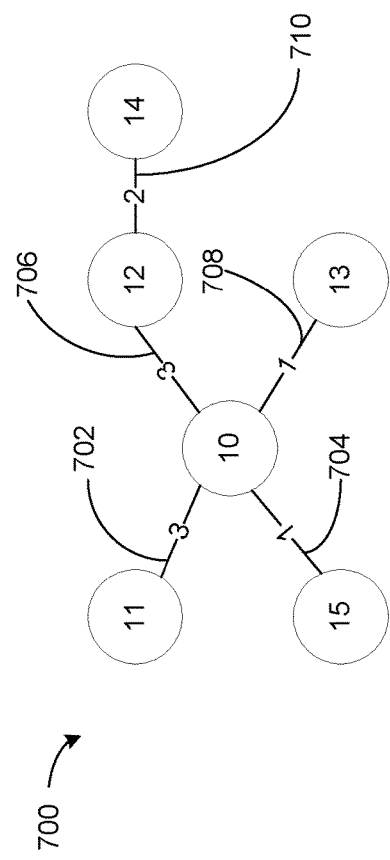
FIG. 7 is a control flow graph generated by the example uber-region formation manager of FIG. 4.

Referring to FIGS. 6 and 7, to prepare the graph, the example graph generator 510 represents the seed as a first node of the graph. In the illustrated example of FIG. 6, the Translation 10 corresponds to the seed such that the graph generator 510 generates a node 10 corresponding to the Translation 10. Next, the graph generator 510 examines the contents of the translation queue buffer 508 to identify entries that contain the seed. Thus, the graph generator 510 identifies the example Entry 1 602, the example Entry 2 604, the example Entry 3 606 and the example Entry 4 608. Next, the graph generator 510 examines the entries (e.g., the Entry 1 602, the Entry 2 604, the Entry 3 606, the Entry 4 608) to determine which translations were executed before the seed (e.g., Translation 10). In the example of FIG. 6, the Translation 11 is executed before the translation 10, as reflected in three entries (the Entry 1 602, the Entry 3 606, and the Entry 4 608). To capture this information, the graph generator 510 adds an example node 11 representing the Translation 11 in the graph 700 and connects the node 11 to the node 10 with an example first edge 702. The first edge 702 is assigned a weight of 3 because of the three entries in the queue buffer contents (see FIG. 6) that indicate that the Translation 11 was executed before the Translation 10. The graph generator 510 also determines, based on the entries in the translation queue buffer 508, that the Translation 15 is executed before the translation 10, as reflected in one entry (the Entry 2 604) of the translation queue buffer contents (see FIG. 6). To capture this information, the graph generator 510 adds an example node 15 to the graph and connects the node 15 to the node 10 with an example second edge 704 having a weight of 1. The weight of 1 is assigned the contents of the queue buffer 600 indicate that the Translation 15 was executed before the Translation 10 one time.

The example graph generator 510 next uses the contents of the example translation queue buffer 508 to identify translations that were executed after the seed. As illustrated in FIG. 6, the example Translation 12 was executed after the example Translation 10 in three of the entries (the example Entry 1 602, the example Entry 2 604, the example Entry 3 606) and the example Translation 13 was executed after the Translation 10 in one of the entries (the example Entry 4 608). The graph generator 510 captures this information by adding an example node 12 representing the Translation 12 to the graph 700 and couples the node 10 and node 12 with an example third edge 706 assigned a weight of 3. Additionally, the graph generator 510 adds an example node 13 and couples the nodes 10 and 13 with an example fourth edge 708 assigned a weight of 1.

After adding the Node 12 and the Node 13, the example graph generator 510 consults the contents of the example translation queue buffer 508 to determine whether any translations were executed after the example Translation 12 or the example Translation 13. As illustrated in FIG. 6, the example Translation 14 executes after the Translation 12 twice (the entry 1 602 and the entry 3 606) so that the graph generator 510 adds an example Node 14 representing the Translation 14 to the graph 700 and further adds an example fifth edge 710 connecting the Node 12 to the Node 14 having an edge weight of 2. In some examples, the graph generator 510 stops adding additional nodes to the graph based on heuristic limits that can be set using one or more policies.

Figure 8:
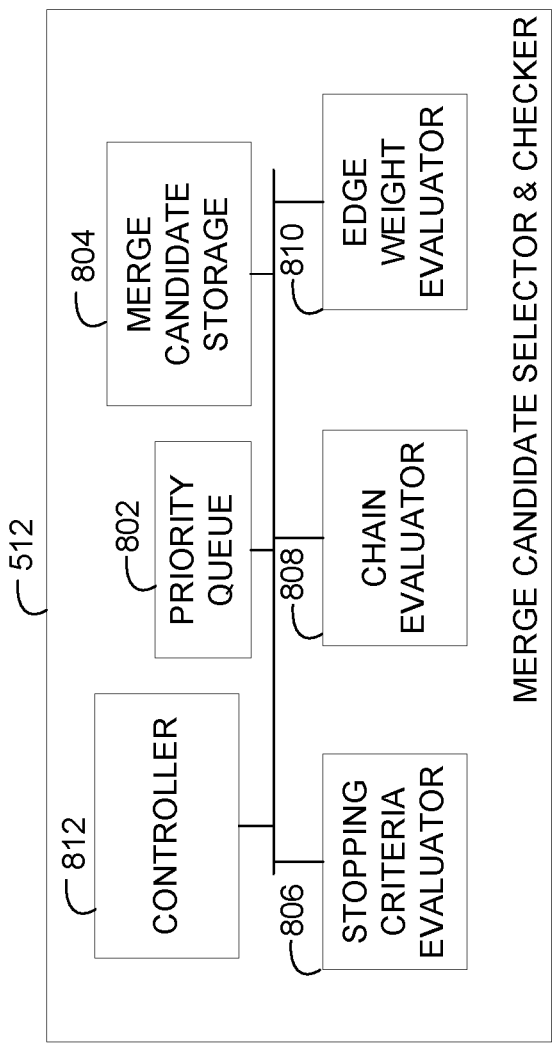
FIG. 8 is a block diagram of an example merge candidate selector and checker of the example uber-region formation manager of FIG. 5.

The block diagram of FIG. 8 includes an example implementation of the example merge candidate selector and checker 512. Referring now to FIGS. 5 and 8, when the example graph generator 510 has finished generating the graph 700, the example merge candidate selector 512 operates to select a set of translations that are candidates to be merged with the seed. In some examples, the merge candidate selector 512 includes an example priority queue 802 that uses the edge weights of the graph 700 as a priority key, an example merge candidate storage, an example stopping criteria evaluator 806, an example chain evaluator 808, an example edge weight evaluator 810 and an example controller 812. In some examples, the controller 812 of the merge candidate selector 512 accesses the graph 700 generated by the graph generator 510 and causes the seed (e.g., the example Translation 10) identified in the graph 700 to be placed into the priority queue 802.

The example controller 812 of the merge candidate selector and checker 512 then de-queues the seed from the priority queue 520 and stores information identifying the seed in the merge candidate storage 804. When the seed information is placed in the merge candidate storage 804, the controller 812 examines the graph generated by the graph generator 510 to identify the predecessor and successor nodes of the seed. The controller 812 then supplies information identifying the translations represented by the predecessor and successor nodes to the stopping criteria evaluator 806 which evaluates the translations against a set of stopping criteria. In some examples, the stopping criteria evaluator 806 adds the translations represented by the successor and predecessor nodes to the priority queue 802 unless the translations satisfy any of the stopping criteria. In some examples, the set of stopping criteria include: 1) the node/translation is the current translation (and, therefore, has already been added), 2) the node/translation is no longer valid (which can occur if the node/translation is no longer executing), 3) the node/translation's metadata is the same as the metadata of another translation already included in the merge candidate storage, 4) the node/translation is not legal due to, for example, SMC, 5) the node/translation has a mismatched translation option (e.g., when the node/translated has been translated using a different optimization technique), and/or 6) the node/translation is based on a previously generated uber-region. After the nodes/translations have been evaluated against the stopping criteria, the nodes/translation remaining in the priority queue 802 are evaluated by the example chain evaluator 808.

In some examples, the example chain evaluator 808 determines whether the translations/nodes included in the example priority queue 802 are chained (via one or more edges) to the seed directly and/or to the seed via one or more of the other translations/nodes included in the priority queue 802. In some examples, the example chain evaluator causes translations that are not included on at least one chain of nodes that includes the seed to be eliminated/removed from the priority queue 802. (As used herein, a chain of nodes/translations refers to a set of nodes/translations that are linked via one or more edges.) Translations removed from the priority queue 802 are no longer considered eligible to merge with the seed. The chain evaluator 808, when determining whether the translations/nodes included in the priority queue 802 are also included on at least one chain of nodes that includes the seed, also obtains information about extended chains that include the seed. In some examples, the extended chains are extensions of the chains included in the graph 700. In some examples, the extended chains are identified using information stored in the translation queue buffer 508 and/or by accessing and scanning the translation-associated metadata stored in the translation results and metadata storage 408. In some examples, the chain evaluator 808 causes the translations/nodes included on the extended chains to be added to the priority queue 802 and identifies the added translations/nodes to the example stopping criteria evaluator 806 for evaluation against the stopping criteria. As described above, the stopping criteria evaluator 806 removes any of the translations/nodes that satisfy the stopping criteria from the priority queue 802. In some examples, the chain evaluator 808 only extends the chain to include nodes/translations that result in the chain having fewer than a threshold number of instructions, fewer than a threshold number of blocks, and/or fewer than a threshold number of exits. The threshold number of instructions, blocks, and exits are selectable based on any of number of factors including the available register resources that the translator is configured to use.

In some examples, the example edge weight evaluator 810 also evaluates the nodes/translations included in the priority queue 802. In some examples, the edge weight evaluator 810 evaluates the nodes/translations in the priority queue 802 by identifying which of the edges of the seed has the heaviest weight. As described above, the edge weight, in this context, refers to the number of times that a first translation represented by a first node has executed before (or after) a second translation represented by a second node. In some examples, the edge weight evaluator 810 chooses the translation that is coupled to the seed by the edge having the heaviest weight for merge with the seed. In some examples, the edge weight evaluator 810 determines whether the weight of the heaviest edge is at least a threshold portion of the total weight of all edges coupled to the seed. When the edge weight evaluator 810 determines that the weight of the heaviest edge is at least the threshold portion of the total weight of all edges coupled to the seed, the edge weight evaluator 810 chooses the corresponding translation to merge with the seed. When the weight of the heaviest edge is not at least a threshold portion of the total weight of all edges coupled to the seed, the corresponding translation is not chosen for merging with the seed. In some examples, the threshold portion of the total weight is four eighths or five eighths of the total weight of all edges of the seed. In some examples, the value of the threshold portion of the total weight is modifiable and can be tuned for higher performance gain and loop coverage based on the dynamic execution of the program by the example processor 110 (see FIG. 1).

Referring still to FIG. 8, in some examples, when a translation located in the priority queue is selected for merge (e.g., after being evaluated by the example stopping criteria evaluator 806, the example chain evaluator 808, and the example edge weight evaluator 810), the controller 812 causes the selected translation to be de-queued from the example priority queue 802 and added to the example merge candidate storage 804. Thereafter, the example merge candidate selector and checker 512 repeats the evaluation process described above (e.g., using the stopping criteria evaluator 806, the chain evaluator 808, and the edge weight evaluator 810) with respect to the de-queued translation to determine which, if any, other translations are to be included in the merge candidate storage 804. In some examples, the evaluation process is repeated until no further candidates remain in the priority queue 802. In some examples, the number of translations chosen for merge is at least two. In some examples, the number of candidate translations chosen for merge is modifiable.

Referring still to FIGS. 5 and 8, when no translations remain in the priority queue, the example controller 812 of the example merge candidate selector and checker 512 notifies the example entry point selector 514 that a set of translations have been selected for merge and are stored in the example merge candidate storage 804. The entry point selector 514 performs an entry point selection process to identify entry points for the translations. In some examples, the entry point selector 514 begins the selection process by making all translations to be included in the merge (referred to as "merge translations") unreachable. The entry point selector 514 then uses a depth first search algorithm to traverse each translation in search of a loop. In some examples, the entry point selector 514 obtains the translations and associated instructions from the example translation results and metadata storage 408 (see FIG. 4). For each loop that is detected, the entry point selector 514 chooses a best loop header. In some examples, for each translation that includes a loop, the entry point selector 514 initially identifies the entry point of the translation that has the lowest extended instruction pointer (EIP) register value as the loop header. In some examples, the entry point selector then uses a trace graph to identify the loop entry. In some examples, the trace graph is used to identify a loop entry that is: 1) most frequently preceded by a translation that is not one of the merge translations, and 2) follows the translation that most often exits the loop. In some examples, if the entry found using the trace graph also has the most frequent edge count (based on heuristics), the entry found using the trace graph is chosen as the entry point. If the entry found using the trace graph does not have the most frequent edge count, the entry with the lowest execution address is selected as the loop header. In some examples, the entry point selector 514 counts the entry points of the translations to be merged and compares the count to a threshold entry count value. If the threshold entry count value is exceeded, the merging process fails.

In some examples, when the translation selection performed by the example entry point selector 514 fails (e.g., fewer than two merge translations are identified, the threshold entry count value is exceeded, etc.), the example processor 110 (see FIG. 4) continues executing the current translation (e.g., the translation that was being executed when the interrupt timer expired).

In some examples, when the translation selection process performed by the example entry point selector 514 succeeds, the entry point selector 514 supplies information identifying the translations to be merged and the selected entry points to the example uber-region creator 520. The uber-region creator 520 topologically sorts the entry point EIP register values of the candidate translations and accumulates basic blocks from the merge translations. Provided that a set of block and instruction thresholds are not exceeded, the uber-region creator 520 merges the basic blocks together to form an uber region. If, the block and instruction thresholds are exceeded, the merging process fails and the uber-region creation process begins again with a current translation. The uber-region creation cannot start immediately because it is highly likely to lead to another failure. In some examples, the information related to the failed uber-translation attempt can be saved and tried again at a later time. In some examples, the instruction limit is 500 and the block limit is 64. In some examples, the uber-region creator 520 supplies information identifying the uber region to the dynamic binary translator for re-translation as a single unit. Provided that the re-translation is successful, the translation used as the seed is removed from the translation results and metadata storage 408 and/or a hardware translation lookup table and the newly created uber-translation is inserted in its place. If the re-translation is not successful due to limited resources, the dynamic binary code translator 106 saves the uber region information in the target code storage 114 and attempts to perform the re-translation of the uber region at a later time when more resources are available.

Uber regions created using the second dynamic binary translation system outperform conventional region former technologies in loop coverage, region size, and instructions-per-cycle (IPC) gain. Loop coverage, as used here, refers to the ratio of the 1) dynamic instructions from loops and loop nests that are captured in one region to 2) the total number of dynamic instructions executed. Region size refers to the average number of native instructions in a region for which the translations are executed. IPC gain is determined using the performance gain obtained when executing the optimized translations resulting from uber regions. Using a mix of benchmarks from various suites of tools representing a mix of client and server workloads, the second dynamic binary translation system obtained 6% more loop coverage than a baseline system using a conventional region former, a 1.62 times larger region, and an overall IPC gain of 1.4%.

While an example manner of implementing the example first dynamic binary translation system 102 having the example region formation manager 110 is illustrated in FIGS. 1 and 2, and an example manner of implementing the example second dynamic binary translation system 402 having the example uber-region formation manager 404 is illustrated in FIGS. 4, 5 and 8 one or more of the elements, processes and/or devices illustrated in FIGS. 1, 2, 4, 5, and 8 may be combined, divided, re-arranged, omitted, eliminated and/or implemented in any other way. Further, the example dynamic binary code translator 106, region formation manager 110, the example region storage 203, the example first execution profiler 204, the example queue manager 206, the example queue 208, the example initializer 210, the example initial region former 212, the example region extender 216 the example loop characteristics storage 218, the example loop selector 220, the example criteria storage 222, the example region pruner 224, the example uber-region formation manager 404, the example translation results and metadata storage 408, the example second execution profiler 410, the example translation queue 502, the example translation queue sampler 504, the example policy storage 506, the example translation queue buffer 508, the example graph generator 510, the example merge candidate selector and checker 512, the example entry point selector 514, the example uber-region creator 520, the example priority queue 802, the example merge candidate storage 804, the example stopping criteria evaluator 806, the example chain evaluator 808, the example edge weight evaluator 810, the example controller 812, and/or, more generally, the example first dynamic binary translation system of FIG. 1 and the example second dynamic binary translation system of FIG. 4 may be implemented by hardware, software, firmware and/or any combination of hardware, software and/or firmware. Thus, for example, any of the example dynamic binary code translator 106, region formation manager 110, the example region storage 203, the example first execution profiler 204, the example queue manager 206, the example queue 208, the example initializer 210, the example initial region former 212, the example region extender 216 the example loop characteristics storage 218, the example loop selector 220, the example criteria storage 222, the example region pruner 224, the example uber-region formation manager 404, the example translation results and metadata storage 408, the example second execution profiler 410, the example translation queue 502, the example translation queue sampler 504, the example policy storage 506, the example translation queue buffer 508, the example graph generator 510, the example merge candidate selector and checker 512, the example entry point selector 514, the example uber-region creator 520, the example priority queue 802, the example merge candidate storage 804, the example stopping criteria evaluator 806, the example chain evaluator 808, the example edge weight evaluator 810, the example controller 812, and/or, more generally, the example first dynamic binary translation system of FIG. 1 and the example second dynamic binary translation system of FIG. 5 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example dynamic binary code translator 106, region formation manager 110, the example region storage 203, the example first execution profiler 204, the example queue manager 206, the example queue 208, the example initializer 210, the example initial region former 212, the example region extender 216, the example loop characteristics storage 218, the example loop selector 220, the example criteria storage 222, the example region pruner 224, the example uber-region formation manager 404, the example translation results and metadata storage 408, the example second execution profiler 410, the example translation queue 502, the example translation queue sampler 504, the example policy storage 506, the example translation queue buffer 508, the example graph generator 510, the example merge candidate selector and checker 512, the example entry point selector 514, the example uber-region creator 520, the example priority queue 802, the example merge candidate storage 804, the example stopping criteria evaluator 806, the example chain evaluator 808, the example edge weight evaluator 810, and/or the example controller 812 is/are hereby expressly defined to include a non-transitory computer readable storage device or storage disk such as a memory, a digital versatile disk (DVD), a compact disk (CD), a Blu-ray disk, etc. including the software and/or firmware. Further still, the example first dynamic binary translation system 102 of FIG. 1 and/or the example second dynamic binary translation system 402 of FIG. 4 may include one or more elements, processes and/or devices in addition to, or instead of, those illustrated in FIGS. 2, 5, and 8 and/or may include more than one of any or all of the illustrated elements, processes and devices.

Figure 13:
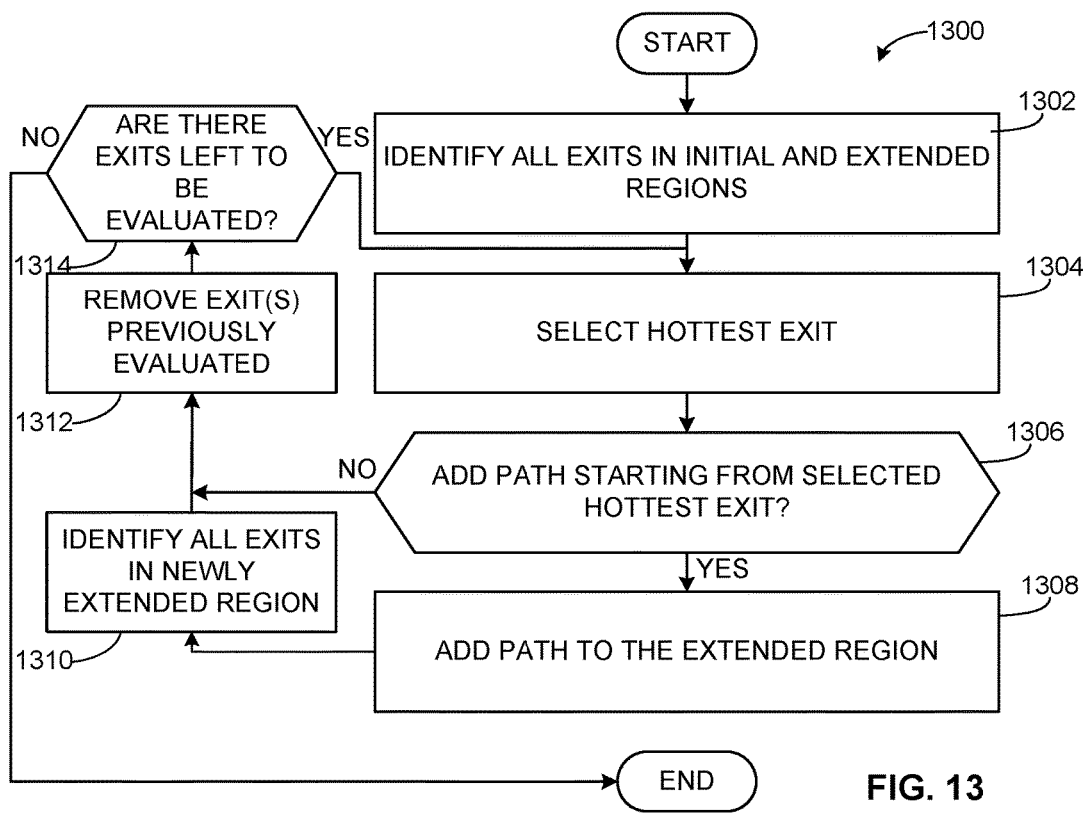
FIG. 13 is a flowchart representative of machine readable instructions which may be executed to implement the example region extender of FIG. 2.
Figure 14:
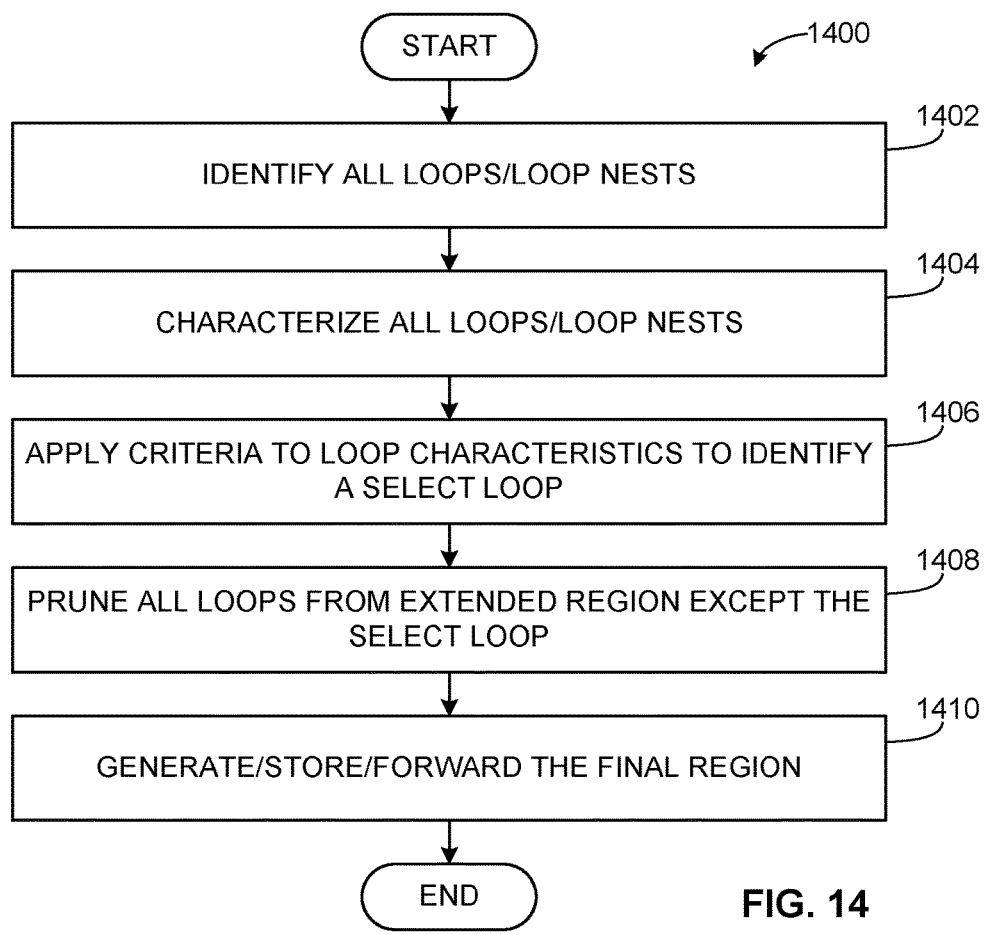
FIG. 14 is a flowchart representative of machine readable instructions which may be executed to implement the example region analyzer, the example loop selector and the example pruner of FIG. 2.
Figure 15:
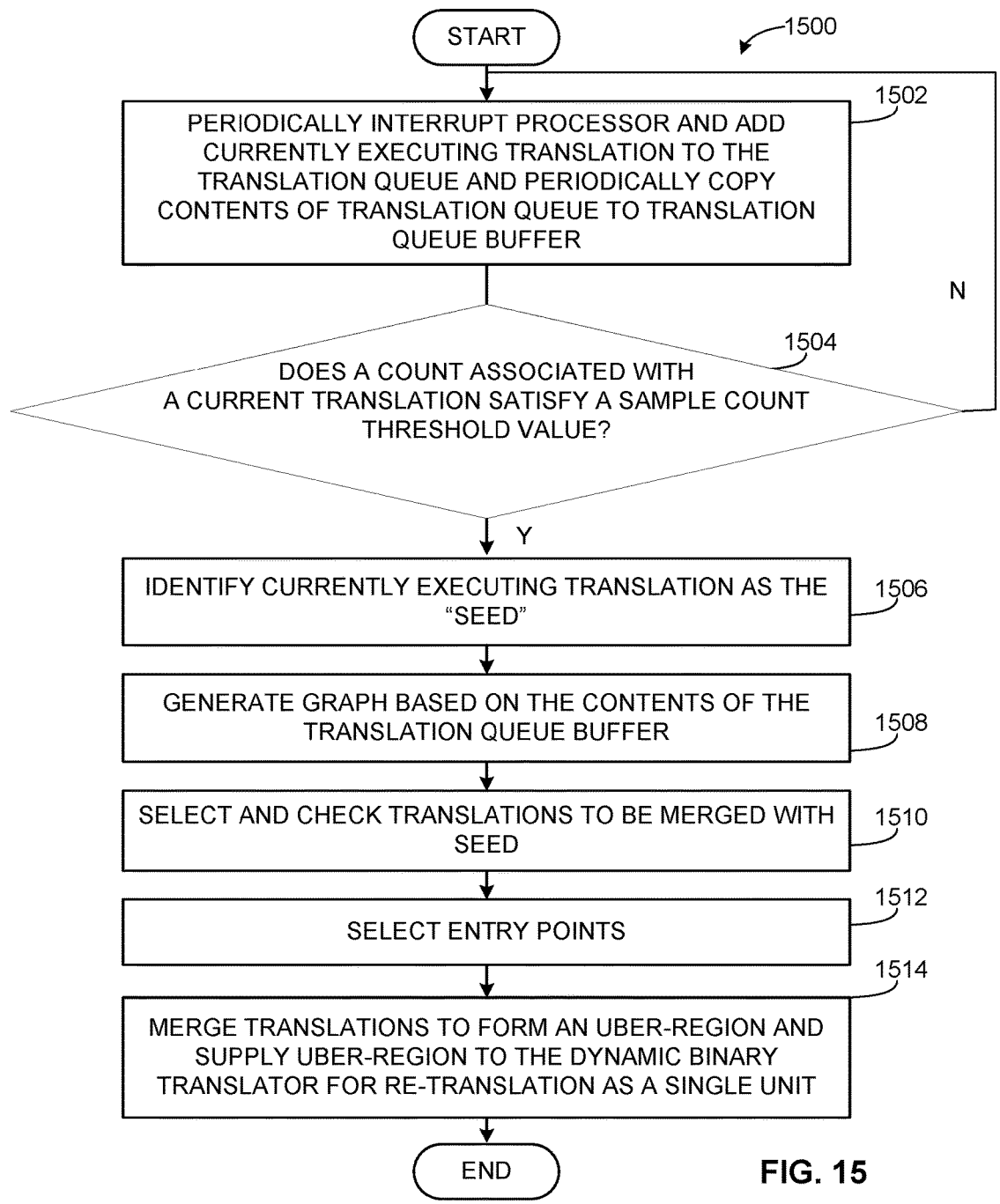
FIG. 15 is a flowchart representative of machine readable instructions which may be executed to implement the example uber-region formation manager of FIG. 5.
Figure 16:
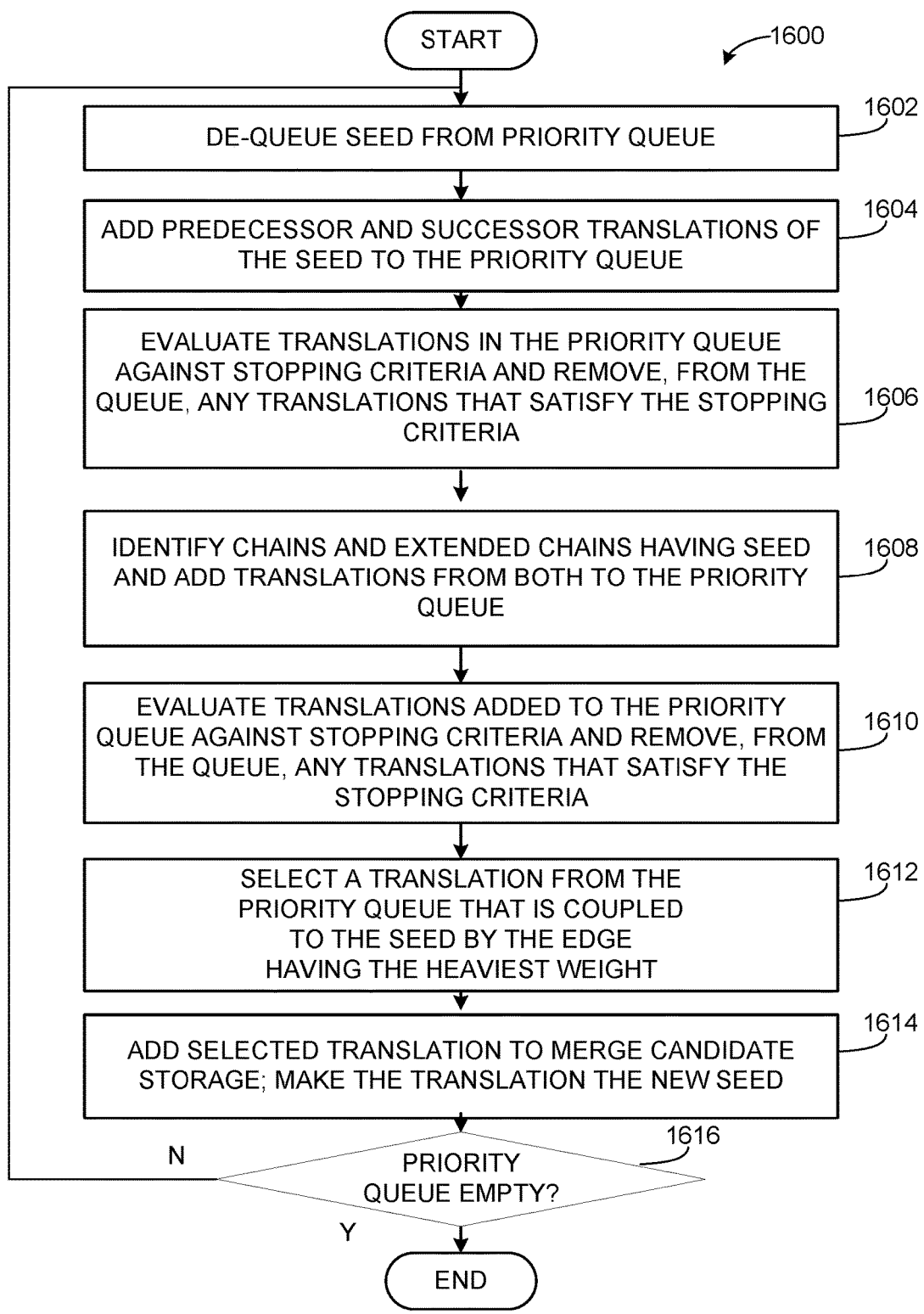
FIG. 16 is a flowchart representative of machine readable instructions which may be executed to implement the example merge candidate selector and checker, the example entry point selector, and the example uber-region creator of FIG. 5.

Flowcharts representative of example machine readable instructions for implementing the region formation manager 110 of FIG. 1 are shown in FIGS. 9-14 and for implementing the uber-region formation manager 404 of FIG. 4 are shown in FIGS. 15 and 16. In these examples, the machine readable instructions comprise a program for execution by a processor such as the processor 1712 or the processor 1812 shown in the example processor platform 1700 and the example processor platform 1800 and discussed below in connection with FIGS. 17 and 18, respectively. The program may be embodied in software stored on a non-transitory computer readable storage medium such as a CD-ROM, a floppy disk, a hard drive, a digital versatile disk (DVD), a Blu-ray disk, or a memory associated with the either the processor 1712 (or the processor 1812), but the entire program and/or parts thereof could alternatively be executed by a device other than the processor 1712 (or the processor 1812) and/or embodied in firmware or dedicated hardware. Further, although the example programs are described with reference to the flowcharts illustrated in FIGS. 9-16, many other methods of implementing the example region formation manager 104 and/or the example uber-region formation manager 404 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 9-16 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

Figure 9:
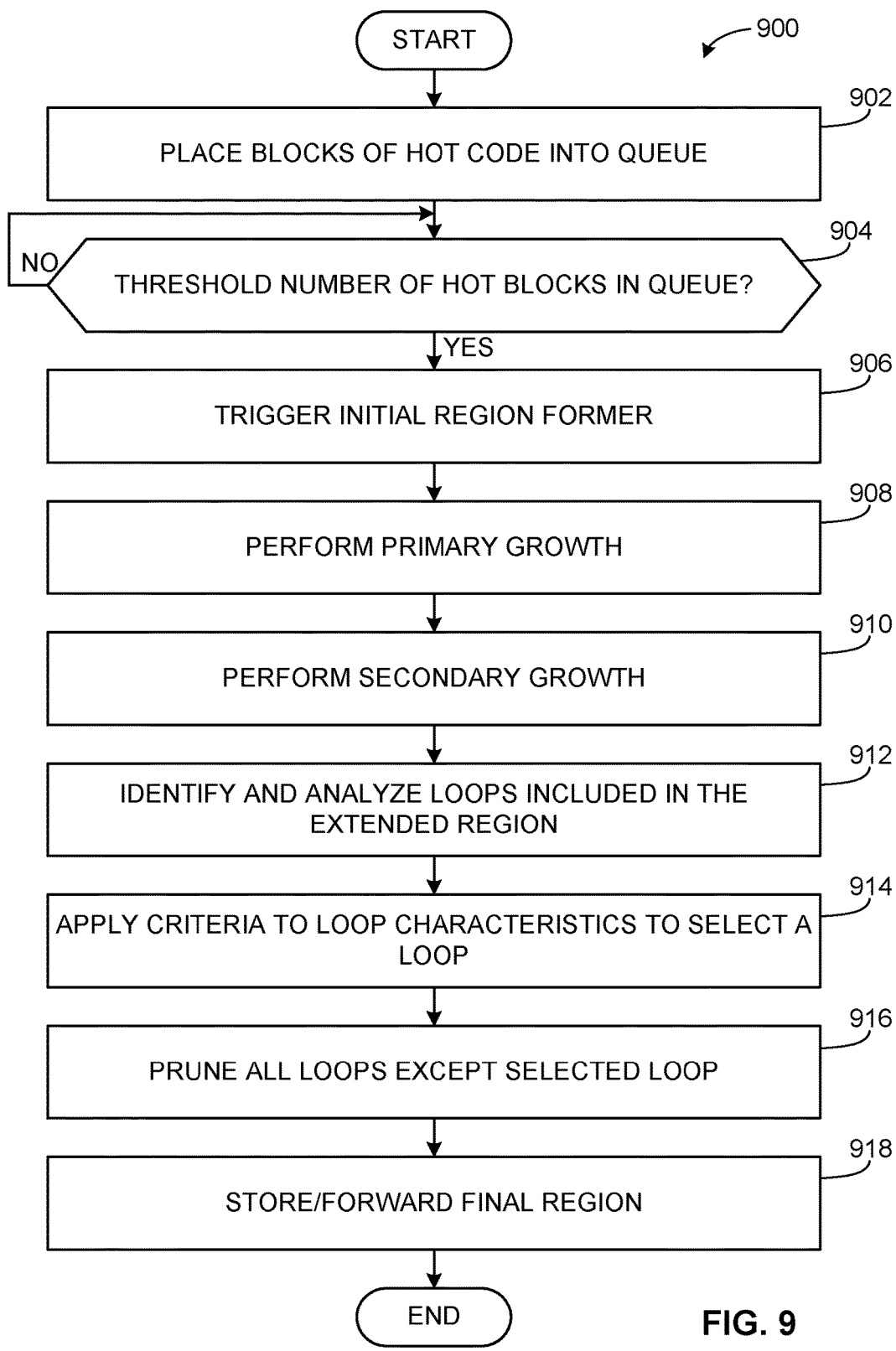
FIG. 9 is a flowchart representative of machine readable instructions which may be executed to implement the example region formation manager of FIG. 2.

The program 900 of FIG. 9 begins at a block 902 at which the example queue manager 206 causes a block of code to be placed into the example queue 208 in response to a notification from the example first execution profiler 204. The example initializer 210 monitors the queue length and determines whether the queue contains a threshold number of blocks of hot code (block 904). If the threshold number of blocks of hot code has not been satisfied, the initializer 210 continues to monitor and evaluate the queue length (block 904). If the initializer 210 determines that the threshold number of blocks of hot code are included in the queue 208 (block 904), the initializer 210 generates a trigger (block 906). The example initial region former 212 responds to the trigger by growing the initial region during a primary region growth phase (block 908). The example region extender 214 extends the initial region in a secondary region growth phase (block 910). The example region analyzer 216 analyzes the loop nests of the extended region generated during the secondary region growth phase and generates a set of characteristics about the loops (block 912). The example loop selector 220 then applies a criteria to the characteristics to identify and select a loop nest to be included in a final region (block 914). The example region pruner 224 prunes the extended region until only the selected loop nest remains to form the final region (block 916). In some examples, the region pruner 224 also performs queue cleanup activities to remove one or more of the blocks of hot code from the queue 208. The region pruner stores information identifying/specifying the final region in the region storage 202 (block 918) and the program 900 ends.

Figure 10:
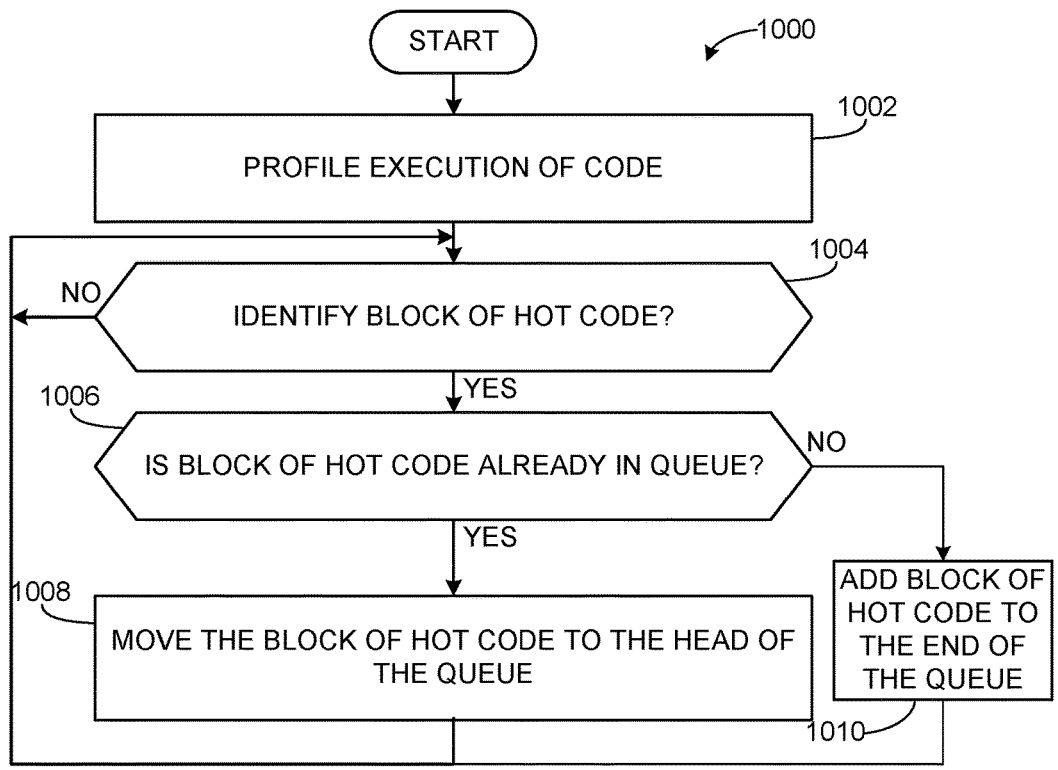
FIG. 10 is a flowchart representative of machine readable instructions which may be executed to implement the example first execution profiler and the example queue manager of FIG. 2.

The program 1000 of FIG. 10 begins at a block 1002 at which the example first execution profiler 204 monitors and profiles the execution of a program code by the example processor 106. When a block of hot code is identified by the execution profiler 204 to the example queue manager 206 (block 1004), the queue manager 206 determines whether the block of hot code is already contained in the queue 208 (block 1006). If the block of hot code is already in the queue 208, the queue manager 206 moves the block of hot code to the head of the queue 208 (block 1008). If the block of hot code is not already in the queue 208, the queue manager 206 adds the block of hot code to the back of the queue 208 (block 1010). After the block of hot code is either moved to the head of the queue 208 or added to the back of the queue 208, execution profiler 204 continues profiling the execution of the code by the processor 106 (block 1002) and the program continues to operate in the manner described so long as the processor 106 is executing the code.

Figure 11:
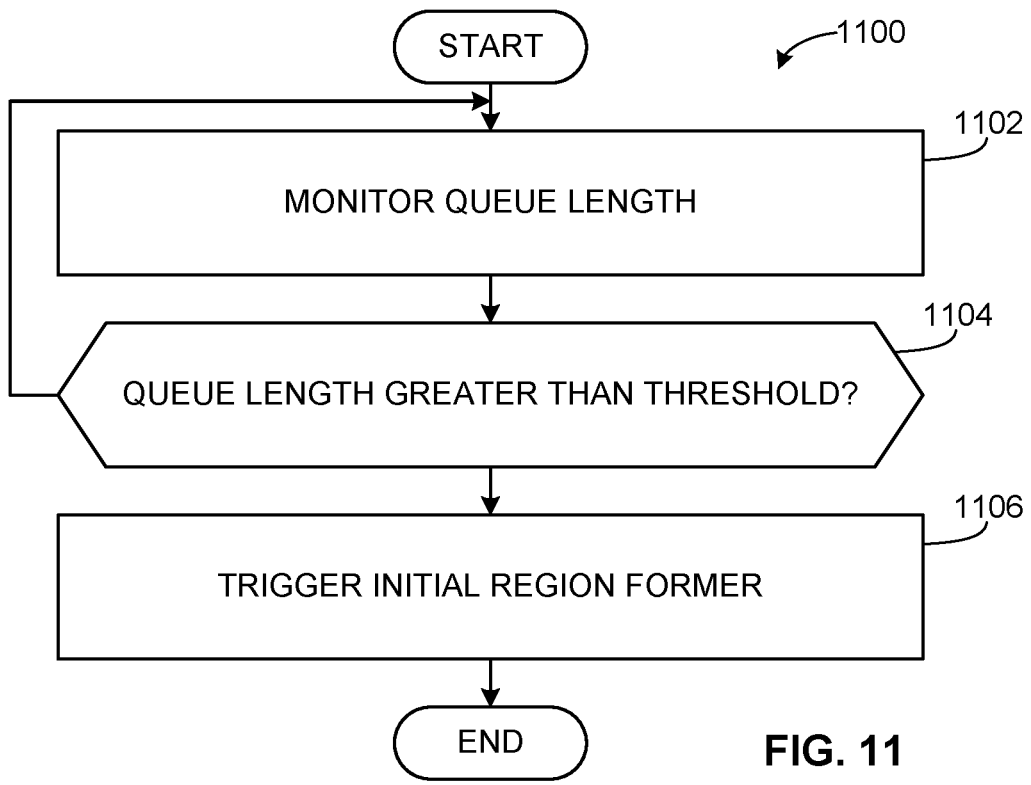
FIG. 11 is a flowchart representative of machine readable instructions which may be executed to implement the example initializer of the example region formation manager of FIG. 2.

The program 1100 of FIG. 11 begins at a block 1102 at which the example initializer 210 monitors the queue length (block 1102) and then determines whether the queue length satisfies a threshold value (block 1104). If the queue length does not satisfy the threshold value, the initializer 210 continues to monitor the queue length (block 1102). If the queue length does satisfy the threshold value, the initializer 210 triggers the initial region former to start performing the initial region growth phase (block 1106). After generating the trigger, the initializer 210 continues to monitor the queue length (block 1102) to identify when a next region is to be generated.

Figure 12:
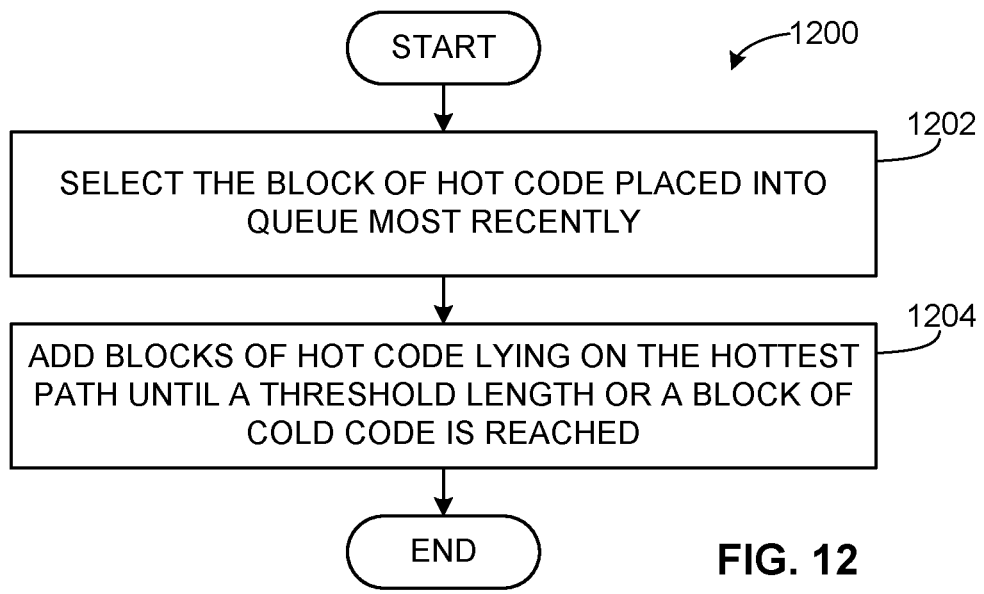
FIG. 12 is a flowchart representative of machine readable instructions which may be executed to implement the example initial region former of FIG. 2.

The program 1200 of FIG. 12 begins at a block 1202 at which the example initial region former 212, in response to the trigger generated by the example initializer 210, selects, from the queue 208, the block of hot code most recently placed into the queue 208. The initial region former 212 then generates a control flow graph that begins at the block of hot code and continues to include the blocks of code lying along a hottest path of the control flow graph until either a threshold number of blocks have been added to the initial region or the hottest path leads to a block of code that is too cold to be placed into the initial region (block 1204) at which time, the program 1200 ends.

The program 1300 of FIG. 13 begins at a block 1302 at which the example region extender 214 identifies exits included in the initial region. In some examples, the region extender 214 begins identifying exits in response to a notification from the example initial region former indicating that the initial growth phase has been completed. The region extender 214 identifies an selects the hottest of the exits (block 1304). The region extender 214 then determines whether to extend the initial region from the hottest exit (block 1306). In some examples, the region extender 214 makes the determination by evaluating blocks of code that are reachable via the hottest exit and, based on the outcome of the evaluation, adding a path including the blocks of code reachable via the hottest exit to the extended region. In some examples, the evaluation includes determining whether a path extending from the exit being evaluated: 1) reaches a block of hot code already connected to the initial region (or the extended region if the initial region has already been extended), or 2) reaches a block of hot code within a threshold number of blocks of code (even if blocks of code intervening between the exit and the block of hot code are blocks of cold code). When making this evaluation, the region extender 214 ignores any back edges included in the blocks of code which helps the region formation manager 110 to capture an outer loop when only a subset of the inner loops of the outer loop are represented by blocks of code included in the queue 208.

When the region extender 214 determines that a path starting from the hottest path is not to be added to the initial region, the region extender 214 removes the previously evaluated exit from among the list of exits (block 1312) and determines whether any exits remain to be evaluated (block 1314). When no exits remain, the program ends. When exits remain to be evaluated, the region extender again selects the selects the hottest of the remaining exit from the list of remaining exits (block 1304). When the region extender 214 determines that a path starting from the hottest path is to be added to the initial region, the region extender 214 adds the blocks of code lying along the path (block 1308). In some examples, the region extender 214 adds blocks lying along the path until encountering (and including) a block of code associated with a back edge or until a threshold number of blocks of code have been added. After the path is added, the region extender 214 identifies additional exits included in the extended region as a result of adding the path (block 1310) and then removes any exits that have already been evaluated from a list of exits to be evaluated (block 1312). If there are exits yet to be evaluated, the region extender continues to select and evaluate a next of the exits (block 1306) and add paths based on the evaluations (block 1308). Alternatively, if no exits remain in the list of exits to be evaluated (determined at the block 1314), the program 1300 ends.

The program 1400 of FIG. 14 begins at a block 1402 at which the example region analyzer 216 analyzes the extended region to identify all loop nests included in the extended region. The region analyzer 216 also characterizes the loop nests by identifying a set of attributes/characteristics of the loop nests (block 1404). In some examples, the region analyzer 216 applies a criteria to the loop nest characteristics to select a loop to be included in the final region (block 1406). The region analyzer 216 identifies the selected loop to the region pruner 224 which responds to the information by pruning, from the extended region, all of the loop nests except for the selected loop nest (block 1408). The region pruner 224 stores the final region and supplies the final region to the dynamic binary translator 104 (see FIG. 4) to be translated as a single unit. Thereafter, the program 1400 ends.

The program 1500 of FIG. 15 begins at a block 1502 at which the example translation queue 502 (see FIG. 5) generates an interrupts at the example processor 110 (see FIG. 4) and collects information identifying a currently executing translation for inclusion in the translation queue 502. Also at the block 1502, the example translation queue sampler 504 periodically captures the contents of the translation queue 502 for storage in the example translation queue buffer 508 (see FIG. 5). The translation queue also determines whether a count value associated with the currently executing translation satisfies a sample count threshold value (block 1504). The count value corresponds to the number of times the currently executing translation has been sampled by the translation queue 502. When the count value satisfies the sample count threshold value, the currently executing translation is determined to be "hot" and is identified as a "seed" (block 1506). When the count value does not satisfy the sample count threshold value, the currently executing translation is not determined to be "hot" and the program returns to periodically interrupting the processor 110 (block 1502). The graph generator 510 generates a graph based on the seed as described above with respect to FIG. 5 (block 1508). Next, the example merge candidate selector and checker 512 (see FIG. 5) uses the graph to identify a set of translations that are candidate for merge with the seed (block 1510). The example entry point selector identifies a set of entry points associated with loops contained in the translations (block 1512). Finally, the translations to be merged with the seed and the entry points identified for the translations are supplied to the example uber-region creator 520 (see FIG. 5) which uses the information to merge the translation into an uber-region (block 1514). In addition, the uber-region creator supplies the uber-region to the translation for re-translation (also at block 1514). Thereafter, the program 1500 ends.

The program 1600 of FIG. 16 begins at a block 1602 at which the example controller 812 (see FIG. 8) of the example merge candidate selector and checker 512 (see FIG. 5) de-queues the seed from the example priority queue 802 (see FIG. 8). The controller then causes the predecessor and successor translations of the seed to be added to the priority queue 802. In some examples, the controller 812 uses the graph generated by the example graph generator 510 (see FIG. 5) to identify the seed and the predecessor and successor translations. The stopping criteria evaluator then evaluates the predecessor and successor translations in the priority queue against a set of stopping criteria and removes any of the translations that satisfy any of the stopping criteria from the priority queue 802 (block 1606). In some examples, the example chain evaluator 808 identifies a set of chains and extended chains containing the seed and adds translations included in the chains to the priority queue 802 (block 1608). In some examples, the stopping criteria evaluator 806 again operates to evaluate the newly added translations against the stopping criteria and again remove any of the translations that satisfy any of the criteria from the priority queue 802 (block 1610). The example edge weight evaluator 810 (see FIG. 8), then selects the translation contained in the priority queue that is coupled to the seed by the edge having the heaviest weight as a candidate for merge with the seed (block 1612). In some examples, the edge weight evaluator 810 causes the selected translation to be placed in the merge candidate storage 804 and makes the selected translation the new "seed" (block 1614). The controller 812 then determines whether the priority queue 802 is empty (block 1616). If the priority queue 802 is not empty, then more translations are to be evaluated for possible merge with the seed and control returns to the blocks 1602 and the blocks subsequent thereto as described above. If the priority queue 802 is empty, then all translations that are merge candidates have been identified and the program 1600 ends.

Figure 17:
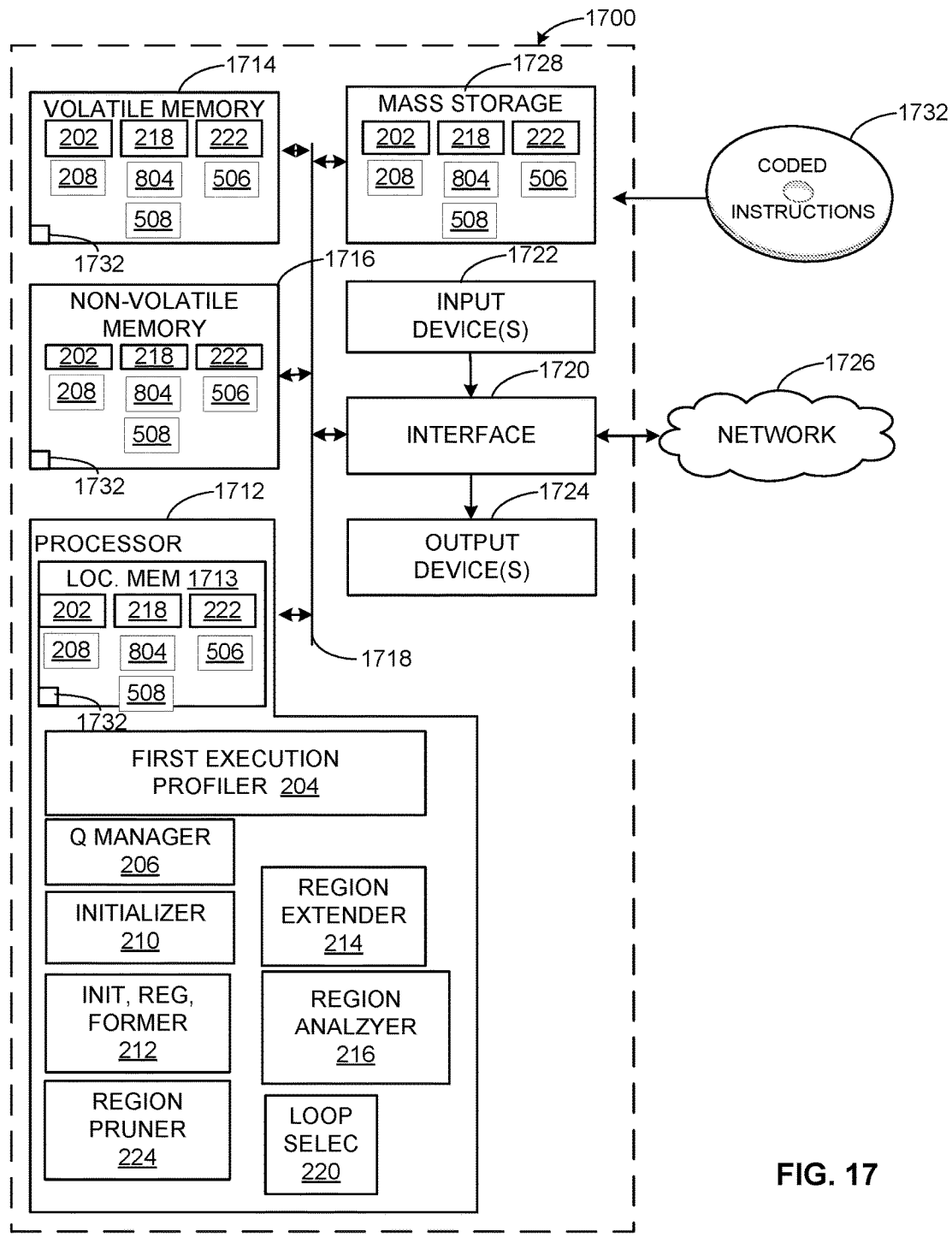
FIG. 17 is a block diagram of an example processing platform structured to execute the instructions of FIGS. 9-14 to implement the example region formation manager of FIG. 1 and FIG. 2.

FIG. 17 is a block diagram of an example processor platform 1700 capable of executing the instructions of FIGS. 9-14 to implement the region formation manager of FIG. 2. The processor platform 1700 can be, for example, a server, a personal computer, a mobile device (e.g., a cell phone, a smart phone, a tablet such as an iPad™), or any other type of computing device.

The processor platform 1700 of the illustrated example includes a processor 1712. The processor 1712 of the illustrated example is hardware. For example, the processor 1712 can be implemented by one or more integrated circuits, logic circuits, microprocessors or controllers from any desired family or manufacturer. The hardware processor may be a semiconductor based (e.g., silicon based) device. In this example, the processor 1712 implements the example first execution profiler 204, the example queue manager 206, the example initializer 210, the example initial region former 212, the example region extender 214, the example region analyzer 216, the example loop selector 220, the example region pruner 224.

The processor 1712 of the illustrated example includes a local memory 1713 (e.g., a cache). The processor 1712 of the illustrated example is in communication with a main memory including a volatile memory 1714 and a non-volatile memory 1716 via a bus 1718. The volatile memory 1714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1716 may be implemented by flash memory and/or any other desired type of memory device. Access to the main memory 1714, 1716 is controlled by a memory controller. The local memory 1713, the volatile memory 1714 and the non-volatile memory 1716 may be used to implement any or all of the example region storage 202, the example queue 208, the example characteristics storage 218, and/or the example criteria storage 222.

The processor platform 1700 of the illustrated example also includes an interface circuit 1720. The interface circuit 1720 may be implemented by any type of interface standard, such as an Ethernet interface, a universal serial bus (USB), and/or a PCI express interface.

In the illustrated example, one or more input devices 1722 are connected to the interface circuit 1720. The input device(s) 1722 permit(s) a user to enter data and/or commands into the processor 1712. The input device(s) can be implemented by, for example, an audio sensor, a microphone, a camera (still or video), a keyboard, a button, a mouse, a touchscreen, a track-pad, a trackball, isopoint and/or a voice recognition system. In some examples, the input device 1722 can be used to enter any of the criteria stored in the criteria storage 222.

One or more output devices 1724 are also connected to the interface circuit 1720 of the illustrated example. The output devices 1724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1720 of the illustrated example, thus, typically includes a graphics driver card, a graphics driver chip and/or a graphics driver processor.

The interface circuit 1720 of the illustrated example also includes a communication device such as a transmitter, a receiver, a transceiver, a modem and/or network interface card to facilitate exchange of data with external machines (e.g., computing devices of any kind) via a network 1726 (e.g., an Ethernet connection, a digital subscriber line (DSL), a telephone line, coaxial cable, a cellular telephone system, etc.).

The processor platform 1700 of the illustrated example also includes one or more mass storage devices 1728 for storing software and/or data. Examples of such mass storage devices 1728 include floppy disk drives, hard drive disks, compact disk drives, Blu-ray disk drives, RAID systems, and digital versatile disk (DVD) drives.

The coded instructions 1732 of FIGS. 9-16 may be stored in the mass storage device 1728, in the volatile memory 1714, in the non-volatile memory 1716, and/or on a removable tangible computer readable storage medium such as a CD or DVD.

Figure 18:
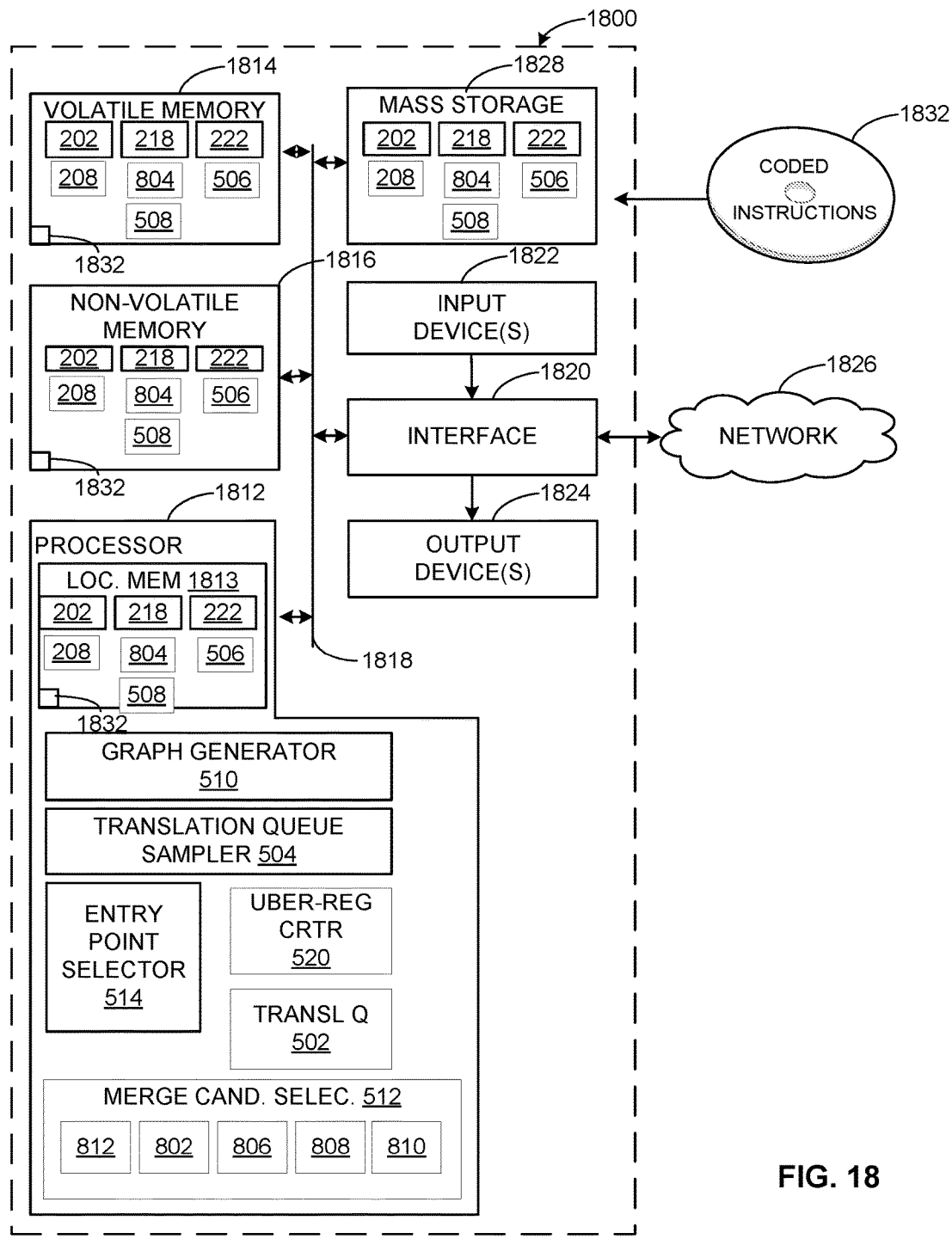
FIG. 18 is a block diagram of an example processing platform structured to execute the instructions of FIGS. 15-16 to implement the example uber-region formation manager of FIG. 4 and FIG. 5.

FIG. 18 is a block diagram of an example processor platform 1800 capable of executing the instructions of FIGS. 15 and 16 to implement the uber-region formation manager 404 of FIG. 4. The processor platform 1800 can be, for example, a server, a personal computer, a mobile device (e.g., a cell phone, a smart phone, a tablet such as an iPad™), or any other type of computing device.

The processor platform 1800 of the illustrated example includes a processor 1812. The processor 1812 of the illustrated example is hardware. For example, the processor 1812 can be implemented by one or more integrated circuits, logic circuits, microprocessors or controllers from any desired family or manufacturer. The hardware processor may be a semiconductor based (e.g., silicon based) device. In this example, the processor 1812 can be used to implement the example second execution profiler 410, the example translation queue 502, the example translation queue sampler 504, the example graph generator 510, the example merge candidate selector and checker 512, the example entry point selector 514, the example uber-region creator 520, the example controller 812, the example priority queue 802, the example stopping criteria evaluator 806, the example chain evaluator 808, the example edge weight evaluator 810, and/or the example uber-region creator 520.

The processor 1812 of the illustrated example includes a local memory 1813 (e.g., a cache). The processor 1812 of the illustrated example is in communication with a main memory including a volatile memory 1814 and a non-volatile memory 1816 via a bus 1818. The volatile memory 1814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1816 may be implemented by flash memory and/or any other desired type of memory device. Access to the main memory 1814, 1816 is controlled by a memory controller. The local memory 1813, the volatile memory 1814 and the non-volatile memory 1816 may be used to implement any or all of the example policy storage 506, the example translation queue buffer 508, and/or the example merge candidate storage 804.

The processor platform 1800 of the illustrated example also includes an interface circuit 1820. The interface circuit 1820 may be implemented by any type of interface standard, such as an Ethernet interface, a universal serial bus (USB), and/or a PCI express interface.

In the illustrated example, one or more input devices 1822 are connected to the interface circuit 1820. The input device(s) 1822 permit(s) a user to enter data and/or commands into the processor 1812. The input device(s) can be implemented by, for example, an audio sensor, a microphone, a camera (still or video), a keyboard, a button, a mouse, a touchscreen, a track-pad, a trackball, isopoint and/or a voice recognition system. In some examples, the input device 1822 can be used to enter any of the policy information stored in the policy storage 506.

One or more output devices 1824 are also connected to the interface circuit 1820 of the illustrated example. The output devices 1824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1820 of the illustrated example, thus, typically includes a graphics driver card, a graphics driver chip and/or a graphics driver processor.

The interface circuit 1820 of the illustrated example also includes a communication device such as a transmitter, a receiver, a transceiver, a modem and/or network interface card to facilitate exchange of data with external machines (e.g., computing devices of any kind) via a network 1826 (e.g., an Ethernet connection, a digital subscriber line (DSL), a telephone line, coaxial cable, a cellular telephone system, etc.).

The processor platform 1800 of the illustrated example also includes one or more mass storage devices 1828 for storing software and/or data. Examples of such mass storage devices 1828 include floppy disk drives, hard drive disks, compact disk drives, Blu-ray disk drives, RAID systems, and digital versatile disk (DVD) drives.

The coded instructions 1832 of FIGS. 15 and 16 may be stored in the mass storage device 1828, in the volatile memory 1814, in the non-volatile memory 1816, and/or on a removable tangible computer readable storage medium such as a CD or DVD.

From the foregoing, it will be appreciated that example methods, apparatus and articles of manufacture have been disclosed that perform region formation to identify multiple blocks of code of a computer program that are to be translated by a dynamic binary translator as a single unit. The region formation managers disclosed herein provides enhanced loop coverage of the computer code which allows a dynamic binary translator to generate translated code that execute more quickly and efficiently. Some such example region formation managers disclosed herein perform two region formation phases (a primary growth phase and a secondary growth phase). The initial region formation is the primary growth phase and the extended region formation is the secondary growth phase. Further, some such region formation managers disclosed herein initiate formation of the initial growth phase only after multiple blocks of hot code have been identified using an execution profiler (instead of only a single block of hot code is identified). Additionally, the disclosed region formation managers analyze an extended region containing multiple loops to identify a best loop nest to be included in the final region. These operational aspects of such region formation managers enable the generation of a final region that includes superior loop coverage and results in improved dynamic binary translation as compared to conventional techniques. Some uber-region formation managers disclosed herein provide enhanced loop coverage of computer code to be translated by a dynamic binary translator by combining two or more regions of translated computer code to form an uber-region. The uber-region is supplied to the dynamic binary translator for re-translation as a single unit. As a result, the dynamic binary translator is able to generate translated code that executes more quickly and efficiently. The uber-region formation manager creates the uber-region by first identifying a hot translation as a seed and then identifying predecessor and/or successor translations of the seed. The predecessor and successor translations of the seed are used to identify further candidate translations that are included in a same chain as the seed and that can be combined with the seed to create an uber-region. The candidate translations to be included in an uber-region are subject to a set of evaluations designed to improve loop coverage, and region size. The candidate translations are then combined to form the uber-region which is subsequently re-translated by a dynamic binary translator. In some examples, the overall process of forming the uber-region results in greater loop coverage, a larger region and a greater IPC gain.

The following further examples are disclosed herein.

Example 1 is an apparatus to perform region formation for a control flow graph. In Example 1, the apparatus includes an initial region former to form an initial region starting at a first block of hot code of the control flow graph. The initial region former adds, to the initial region, blocks of hot code lying on a first hottest path of the control flow graph until reaching one of a block of hot code previously added to the initial region or a block of cold code. The apparatus of Example 1 also includes a region extender to extend the initial region to form an extended region. The extended region includes the initial region and the region extender begins extending the initial region at a hottest exit of the initial region. The region extender adds, to the extended region, blocks of hot code lying on a second hottest path until one of a threshold path length has been satisfied or a back edge of the control flow graph is added to the extended region. The apparatus of Example 1 further includes a region pruner to prune, from the extended region, all loops except a selected loop. The selected loop forms the region.

Example 2 includes the apparatus of Example 1 and further includes a region analyzer to identify and generate characteristics for a number of loop and loop nests included in the extended region. Additionally the apparatus of Example 2 includes a loop selector to select one of the loops identified by the loop analyzer based on a set of criteria. The set of criteria are applied by the loop selector to the characteristics generated by the region analyzer.

Example 3 includes the apparatus of Example 1 and further includes a queue to contain block identifiers of a plurality of blocks of code of the control flow graph identified as hot and an initializer to generate a trigger when the queue includes a threshold number of the blocks of code. In Example 3, the initial region former initiates formation of the initial region in response to the trigger. Further, the threshold number is greater than one.

Example 4 includes the apparatus of Example 3. In Example 4, the first block of hot code is a last block of code added to the queue before the trigger is generated.

Example 5 includes the apparatus of Example 3 and/or 4. In Example 5, the initial region former and the region extender use the queue to determine whether blocks of code are hot.

Example 6 includes the apparatus of any of Examples 1, 2, and 3. In Example 6, the threshold path length is a first threshold path length. In Example 6, the region extender, before adding the second hottest path to the extended region also 1) determines whether the second hottest path at least one of connects back to a block in the extended region, or leads, within a second threshold path length, to a second block of hot code, and 2) based on the determination, adds the blocks of code on the second hottest path to the extended region.

Example 7 includes the apparatus of Example 6. In Example 7, the region extender determines the second hottest path leads, within the second threshold path length, to the second block of hot code, and the second hottest path includes a block of cold code between the hottest exit of the initial region and the second block of hot code.

Example 8 includes the apparatus of any of Examples 1, 2, and 3. In Example 8, the region extender also 1) iterates over respective hottest exits of the initial region and the extended region, in descending order of hotness, and 2) adds blocks of code lying along the respective hottest paths to the extended region when the respective hottest paths meet a criteria.

Example 9 includes the apparatus of any of Examples 1, 2, and 3. In Example 9, the region is a first region and the apparatus also includes an uber-region former to merge a first translation generated based on the first region with a second translation generated based on a second region. The merging of the first and second translations forms an uber-region.

Example 10 includes the apparatus of Example 9. The apparatus of Example 10 also includes a queue to identify a hot translation, and a graph generator to generate a flow graph including the hot translation, predecessor translations and successor translations of the hot translation, and a translation selector to select at least one of the predecessor translations and successor translations to be merged with the hot translation. In Example 10, the hot translation is the first translation and the at least one of the predecessor translations and successor translations is the second translation.

Example 11 is one or more non-transitory machine-readable storage media including machine-readable instructions. The instructions, when executed, cause at least one processor to at least form an initial region. The initial region begins at a first block of hot code of a control flow graph and includes blocks of hot code lying on a first hottest path extending from the first block of hot code of the control flow graph until either a block of hot code previously added to the initial region is reached or a block of cold code is reached. The instructions of Example 11 also cause the at least one processor to extend the initial region to form an extended region. The extended region includes the initial region. Extending the initial region begins at a hottest exit of the initial region and includes adding blocks of hot code lying on a second hottest path of the control flow graph until either a threshold path length has been satisfied or a block of hot code associated with a back edge of the control flow graph is added to the extended region. The instructions of Example 11 also cause the at least one processor to prune a set of loops excluding a selected loop from the extended region. The selected loop forms the final region.

Example 12 includes the one or more non-transitory machine-readable storage media of Example 11, and further includes instructions to cause the at least one processor to identify loops and loops nests included in the extended region, and to generate characteristics for the loops and loop nests. Additionally, the instructions of Example 11 cause the processor to, based on the characteristics, select one of the loops.

Example 13 includes the one or more non-transitory machine-readable storage media of claim 11, and further includes instructions to cause the at least one processor to, based on a profile, identify blocks of code included in the control flow graph that are hot, and add the names of the blocks of code identified as hot to a queue. The instructions of Example also cause the processor to generate a trigger when the queue includes a threshold number of blocks of code. In Example 11, the formation of the initial region is initiated in response to the trigger, and the threshold number is greater than one.

Example 14 includes the one or more non-transitory machine-readable storage media of claim 13. In Example 14, the first block of hot code is a last block of code added to the queue before the trigger is generated.

Example 15 includes the one or more non-transitory machine-readable storage media of Example 11. In Example 15, the threshold path length is a first threshold path length.

Example 15 further includes instructions to cause the at least one processor to, before adding blocks of code lying on the second hottest path to the region, determine whether the second hottest path at least one of connects back to a previously formed part of the initial region or the extended region, or leads, within a second threshold path length, to a second block of hot code. Based on the determination, the instructions of Example 15 cause the processor to add the blocks of code lying on the second hottest path to the extended region.

Example 16 includes the one or more non-transitory machine-readable storage media of Example 15. In Example 16, the second hottest path is determined to lead, within the second threshold path length, to the second block of hot code, and the second hottest path includes a block of cold code between the hottest exit of the initial region and the second block of hot code.

Example 17 includes the one or more non-transitory machine-readable storage media of Example 14, and also includes instructions to cause the at least one processor to iteratively select the respective hottest exits of the region, in descending order of hotness, and add blocks of code lying along the respective hottest paths to the extended region based on whether the respective hottest paths meet a criteria.

Example 18 includes the one or more non-transitory machine-readable storage media of any of Examples 11, 12, 13, 14, 15, 16 and 17. In Example 18, the final region is a first region. The instructions further cause the at least one processor to merge a first translation generated based on the first region with a second translation generated based on a second region. In Example 18, the merging of the first and second translations forms an uber-region.

Example 19 includes the one or more non-transitory machine-readable storage media of Example 18. In Example 19, the instructions further cause the one or more processors to identify a hot translation, generate a flow graph including the hot translation, predecessor translations and successor translations of the hot translation, and select at least one of the predecessor translations and successor translations to be merged with the hot translation. In Example 19, the hot translation is the first translation and the at least one of the predecessor translations and successor translations are the second translation.

Example 20 is a method to from a region that includes forming, by executing an instruction with a processor, an initial region. The initial region begins at a first block of hot code of a control flow graph and includes blocks of hot code lying on a first hottest path extending from the first block of hot code until either a block of hot code previously added to the initial region is reached or a block of cold code is reached. The method of Example 20 also includes extending, by executing an instruction with the processor, the initial region to form an extended region. The extended region includes the initial region. Extending the region begins at a hottest exit of the initial region and includes adding blocks of hot code lying on a second hottest path of the control flow graph until either a threshold path length has been satisfied or a block of hot code associated with a back edge of the control flow graph is added to the extended region. The method of Example 20 further includes pruning, by executing an instruction with the processor, the extended region to a single loop. In Example 20, the single loop is a final region.

Example 21 includes the method of Example 20 and further includes identifying loops and loops nests included in the extended region, generating characteristics for the loops and loop nests, and, based on the characteristics, selecting one of the loops to be the single loop.

Example 22 includes the method of Example 20 and further includes, based on a profile, identifying blocks of code included in the control flow graph that are hot, adding the names of the blocks of code identified as hot to a queue, and generating a trigger when the queue includes a threshold number of blocks of code. In Example 22, the formation of the initial region is initiated in response to the trigger, and the threshold number is greater than one.

Example 23 includes the method of Example 21. In the method of Example 23, the first block of hot code is a last block of code added to the queue before the trigger is generated.

Example 24 includes the method of any of Examples 20-23. In Example 24, the threshold path length is a first threshold path length and the method of Example 24 further includes, before adding blocks of code lying on the second hottest path to the region, determining whether the second hottest path at least one of connects back to a previously formed part of either the initial region or the extended region, or leads, within a second threshold path length, to a second block of hot code. The method of Example 24 also includes, based on the determination, adding the blocks of code lying on the second hottest path to the extended region.

Example 25 includes the method of any of Examples 20-23. The method of Example 25 further includes merging a first translation generated based on the first region with a second translation generated based on a second region. In Example 25, the merging of the first and second translations forms an uber-region.

Example 26 includes the method of Example 25 and further includes identifying a hot translation, generating a flow graph including the hot translation, predecessor translations and successor translations of the hot translation, and selecting at least one of the predecessor translations and successor translations to be merged with the hot translation. In Example 26, the hot translation is the first translation and the at least one of the predecessor translations and successor translations is the second translation.

Example 27 includes the method of any of Examples 20 and 21 and further includes, based on a profile, identifying blocks of code included in the control flow graph that are hot, adding the names of the blocks of code identified as hot to a queue, and generating a trigger when the queue includes a threshold number of blocks of code. In Example 27, the formation of the initial region is initiated in response to the trigger, and the threshold number is greater than one.

Example 28 includes the method of any of Examples 20-23, and 27. In Example 28, the threshold path length is a first threshold path length and the method of Example 28 further includes, before adding blocks of code lying on the second hottest path to the region, determining whether the second hottest path at least one of connects back to a previously formed part of either the initial region or the extended region, or leads, within a second threshold path length, to a second block of hot code. The method of Example 28 also includes, based on the determination, adding the blocks of code lying on the second hottest path to the extended region.

Example 29 includes the method of any of Examples 20-23, and 28, and further includes merging a first translation generated based on the first region with a second translation generated based on a second region. In Example 29, the merging of the first and second translations forms an uber-region.

Example 30 includes the method of Example 29 and further includes identifying a hot translation, generating a flow graph including the hot translation, predecessor translations and successor translations of the hot translation, and selecting at least one of the predecessor translations and successor translations to be merged with the hot translation. In Example 30, the hot translation is the first translation and the at least one of the predecessor translations and successor translations is the second translation.

Example 31 is an apparatus that includes means to perform the method of any of Examples 20-23 and 27-30.

Example 32 is a machine-readable storage including machine-readable instructions. The instructions, when executed, implement the method of any of Examples 20-23 and 27-30.

Example 33 is an apparatus to perform region formation for a control flow graph. The apparatus of Example 33 includes means to form an initial region starting at a first block of hot code of the control flow graph. The means to form the initial region add, to the initial region, blocks of hot code lying on a first hottest path of the control flow graph until reaching one of a block of hot code previously added to the initial region or a block of cold code. The apparatus of Example 33 also includes means to extend the initial region to form an extended region which includes the initial region. The means to extend the initial region begin extending the initial region at a hottest exit of the initial region. Additionally, the means to extend the initial region add, to the extended region, blocks of hot code lying on a second hottest path until one of a threshold path length has been satisfied or a back edge of the control flow graph is added to the extended region. The apparatus of Example 33 also includes means to prune, from the extended region, all loops except a selected loop. In Example 33, the selected loop forms the region.

Example 34 includes the apparatus of Example 33 and further includes means to identify and generate characteristics for a number of loop and loop nests included in the extended region, and means to select one of the loops identified by the loop analyzer based on a set of criteria. In Example 34, the set of criteria are applied by the means to select one of the loops to the characteristics.

Example 35 includes the apparatus of Example 33 and further includes means to store block identifiers of a plurality of blocks of code of the control flow graph identified as hot. Additionally, the apparatus of Example 35 includes means to generate a trigger when the means to store the block identifiers includes a threshold number of the blocks of code. In Example 46, the means to form the initial region initiate formation of the initial region in response to the trigger. Further, the threshold number greater is than one.

Example 36 includes the apparatus of Example 35. In Example 36, the first block of hot code is a last block of code added to the means to store the block identifiers before the trigger is generated.

Example 37 includes the apparatus of any of Examples 35 and 36. In Example 37, the means to form the initial region and the means to extend the initial region use the means to store block identifiers to determine whether blocks of code are hot.

Example 38 includes the apparatus of any of Examples 33, 34, and 35. In Example 38, the threshold path length is a first threshold path length, and, before adding the second hottest path to the extended region, the means to extend the initial region determines whether the second hottest path at least one of connects back to a block in the extended region, or leads, within a second threshold path length, to a second block of hot code. In Example 38, based on the determination, the means to extend the initial region adds the blocks of code on the second hottest path to the extended region.

Example 39 includes the apparatus of Example 38. In Example 39, the means to extend the initial region determines whether the second hottest path leads, within the second threshold path length, to the second block of hot code, and the second hottest path includes a block of cold code between the hottest exit of the initial region and the second block of hot code.

Example 40 includes the apparatus of any of Examples 33, 34, and 35. In Example 40, the means to extend the initial region also iterates over respective hottest exits of the initial region and the extended region, in descending order of hotness. Additionally, the means to extend the initial region adds blocks of code lying along the respective hottest paths to the extended region when the respective hottest paths meet a criteria.

Example 41 includes the apparatus of any of Examples 33, 34, and 35. In Example 41, the region is a first region, and the apparatus also includes means to merge a first translation generated based on the first region with a second translation generated based on a second region. In Example 41, the merging of the first and second translations forms an uber-region.

Example 42 includes the apparatus of Example 41. The apparatus of Example 42 also includes a queue to identify a hot translation, a means to generate a flow graph including the hot translation, predecessor translations and successor translations of the hot translation, and means to select at least one of the predecessor translations and successor translations to be merged with the hot translation. In Example 42, the hot translation is the first translation and the at least one of the predecessor translations and successor translations is the second translation.

Example 43 is a machine readable medium including code that, when executed, causes a machine to perform the method of any of Examples 20-26.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to perform region formation for a control flow graph, the apparatus comprising:
    an initial region former to form an initial region starting at a first block of hot code of the control flow graph, the initial region former to add, to the initial region, blocks of hot code lying on a first hottest path of the control flow graph until one of a block of hot code previously added to the initial region or a block of cold code is reached;
    a region extender to extend the initial region to form an extended region, the extended region including the initial region, the region extender to begin extension of the initial region at a hottest exit of the initial region, the region extender to add, to the extended region, blocks of hot code lying on a second hottest path until one of a threshold path length has been satisfied or a back edge of the control flow graph is added to the extended region; and
    a region pruner to prune, from the extended region, all loops except a selected loop, the selected loop to form a final region.

2. The apparatus of claim 1, further including:
    a region analyzer to identify and generate characteristics for a number of loops and loop nests included in the extended region; and
    a loop selector to select one of the loops identified by the region analyzer based on a set of criteria, the set of criteria to be applied by the loop selector to the characteristics generated by the region analyzer.

3. The apparatus of claim 1, further including:
    a queue to contain block identifiers of a plurality of blocks of code of the control flow graph identified as hot; and
    an initializer to generate a trigger when the queue includes a threshold number of the blocks of code, the threshold number greater than one, the initial region former to initiate formation of the initial region in response to the trigger.

4. The apparatus of claim 3, wherein the first block of hot code is a last block of code added to the queue before the trigger is generated.

5. The apparatus of claim 3, wherein the initial region former and the region extender use the queue to determine whether blocks of code are hot.

6. The apparatus of claim 1, wherein the threshold path length is a first threshold path length, and before addition of blocks of code lying on the second hottest path to the extended region, the region extender is to:
    determine whether the second hottest path at least one of connects back to a block in the extended region, or leads, within a second threshold path length, to a second block of hot code; and
    based on the determination, add the blocks of code on the second hottest path to the extended region.

7. The apparatus of claim 6, wherein the region extender is to determine the second hottest path leads, within the second threshold path length, to the second block of hot code, and the second hottest path includes a block of cold code between the hottest exit of the initial region and the second block of hot code.

8. The apparatus of claim 1, wherein the region extender is further to:
    iterate over respective hottest exits of the initial region and the extended region, in descending order of hotness; and
    add blocks of code lying along respective hottest paths to the extended region when the respective hottest paths meet one or more criteria.

9. The apparatus of claim 1, wherein the final region is a first region, and further including an uber-region former to merge a first translation generated based on the first region with a second translation generated based on a second region, the merging of the first and second translations to form an uber-region.

10. The apparatus of claim 9, further including:
    a queue to identify a hot translation;
    a graph generator to generate a flow graph including the hot translation, predecessor translations and successor translations of the hot translation; and
    a translation selector to select at least one of the predecessor translations and successor translations to be merged with the hot translation, the hot translation to be the first translation and the at least one of the predecessor translations and successor translations to be the second translation.

11. One or more non-transitory machine-readable media comprising machine-readable instructions that, when executed, cause one or more processors to at least:
    form an initial region, the initial region to begin at a first block of hot code of a control flow graph and include blocks of hot code lying on a first hottest path, the initial region to extend from the first block of hot code of the control flow graph until one of a block of hot code previously added to the initial region is reached or a block of cold code is reached;

extend the initial region to form an extended region by adding blocks of hot code lying on a second hottest path of the control flow graph to a hottest exit of the initial region until one of a threshold path length has been satisfied or a block of hot code associated with a back edge of the control flow graph is added to the extended region, the extended region including the initial region; and prune, from the extended region, a set of loops excluding a selected loop, the selected loop to be a final region.

12. The one or more non-transitory machine-readable media of claim 11, wherein the instructions, when executed, cause the one or more processors to:
identify loops and loop nests included in the extended region;
generate characteristics for the loops and loop nests; and
based on the characteristics, select one of the loops.

13. The one or more non-transitory machine-readable media of claim 11, wherein the instructions, when executed, cause the one or more processors to:
based on a profile, identify blocks of code included in the control flow graph that are hot;
add names of the blocks of code identified as hot to a queue;
generate a trigger when the queue includes a threshold number of blocks of code, the threshold number greater than one, the formation of the initial region initiated in response to the trigger.

14. The one or more non-transitory machine-readable media of claim 13, wherein the first block of hot code is a last block of code added to the queue before the trigger is generated.

15. The one or more non-transitory machine-readable media of claim 11, wherein the threshold path length is a first threshold path length, and the instructions, when executed, cause the one or more processors to:
before the adding of the blocks of code lying on the second hottest path to form the extended region, determine whether the second hottest path at least one of connects back to a previous part of the initial region or the extended region, or leads, within a second threshold path length, to a second block of hot code; and
based on the determination, add the blocks of code lying on the second hottest path to form the extended region.

16. The one or more non-transitory machine-readable media of claim 15, wherein the second hottest path is determined to lead, within the second threshold path length, to the second block of hot code, and the second hottest path includes a block of cold code between the hottest exit of the initial region and the second block of hot code.

17. The one or more non-transitory machine-readable media of claim 14, further including instructions to cause the one or more processors to: iteratively select respective hottest exits of the initial region and the extended region, in descending order of hotness, and add blocks of code lying along respective hottest paths to form the extended region based on whether the respective hottest paths meet one or more criteria.

18. The one or more non-transitory machine-readable media of claim 11, wherein the final region is a first region, the instructions to cause the one or more processors to:

merge a first translation generated based on the first region with a second translation generated based on a second region to form an uber-region.

19. The one or more non-transitory machine-readable media of claim 18, the instructions further to cause the one or more processors to:
identify a hot translation;
generate a flow graph including the hot translation, predecessor translations and successor translations of the hot translation; and
select at least one of the predecessor translations and successor translations to be merged with the hot translation, the hot translation to be the first translation and the at least one of the predecessor translations and successor translations to be the second translation.

20. A method to from a region, the method comprising:
forming, by executing an instruction with a processor, an initial region, the initial region beginning at a first block of hot code of a control flow graph and including blocks of hot code lying on a first hottest path extending from the first block of hot code until one of a block of hot code previously added to the initial region is reached or a block of cold code is reached;
extending, by executing an instruction with the processor, the initial region to form an extended region, the extended region including the initial region, the extending of the initial region to begin at a hottest exit of the initial region and to include adding blocks of hot code lying on a second hottest path of the control flow graph until one of a threshold path length has been satisfied or a block of hot code associated with a back edge of the control flow graph is added to the extended region; and
pruning, by executing an instruction with the processor, the extended region to a single loop, the single loop being a final region.

21. The method of claim 20, further including:
identifying loops and loop nests included in the extended region;
generating characteristics for the loops and loop nests; and
based on the characteristics, selecting one of the loops to be the single loop.

22. The method of claim 20, further including:
based on a profile, identifying blocks of code included in the control flow graph that are hot;
adding names of the blocks of code identified as hot to a queue; and
generating a trigger when the queue includes a threshold number of blocks of code, the threshold number greater than one, the forming of the initial region initiated in response to the trigger.

23. The method of claim 21, wherein the first block of hot code is a last block of code added to the queue before the trigger is generated.

24. The method of claim 20, wherein the threshold path length is a first threshold path length, the method further including:
before the adding of the blocks of code lying on the second hottest path to form the extended region, determining whether the second hottest path at least one of connects back to a previously formed part of either the initial region or the extended region, or leads, within a second threshold path length, to a second block of hot code; and
based on the determination, adding the blocks of code lying on the second hottest path to form the extended region.

25. The method of claim 20, wherein the final region is a first region, and further including:
merging a first translation generated based on the first region with a second translation generated based on a second region, the merging of the first and second translations to form an uber-region.

26. The method of claim 25, further including:
identifying a hot translation;
generating a flow graph including the hot translation, predecessor translations and successor translations of the hot translation; and
selecting at least one of the predecessor translations and successor translations to be merged with the hot translation, the hot translation being the first translation and the at least one of the predecessor translations and successor translations being the second translation.

27. A system to perform region formation for a control flow graph, the system comprising:
memory including computer readable instructions; and
a processor to execute the instructions to at least:
form an initial region, the initial region to begin at a first block of hot code of a control flow graph and include blocks of hot code lying on a first hottest path, the initial region to extend from the first block of hot code of the control flow graph until one of a block of hot code previously added to the initial region is reached or a block of cold code is reached;
extend the initial region to form an extended region by adding blocks of hot code lying on a second hottest path of the control flow graph to a hottest exit of the initial region until one of a threshold path length has been satisfied or a block of hot code associated with a back edge of the control flow graph is added to the extended region, the extended region including the initial region; and
prune, from the extended region, a set of loops except a selected loop, the selected loop to form a final region.

28. The system of claim 27, wherein the processor is further to:
identify loops and loop nests included in the extended region;
generate characteristics for the loops and loop nests; and
based on the characteristics, select one of the loops.

29. The system of claim 27, wherein the processor is further to:
based on a profile, identify blocks of code included in the control flow graph that are hot;
add names of the blocks of code identified as hot to a queue;
generate a trigger when the queue includes a threshold number of blocks of code, the threshold number greater than one, the formation of the initial region initiated in response to the trigger.

30. The system of claim 27, wherein the threshold path length is a first threshold path length, and the processor is to:
before the adding of the blocks of code lying on the second hottest path to form the extended region, determine whether the second hottest path at least one of connects back to a previous part of the initial region or the extended region, or leads, within a second threshold path length, to a second block of hot code; and
based on the determination, add the blocks of code lying on the second hottest path to form the extended region.

* * * * *

UNITED STATES PATENT AND TRADEMARK OFFICE
CERTIFICATE OF CORRECTION

PATENT NO.        : 10,474,442 B2
APPLICATION NO.   : 15/721456
DATED             : November 12, 2019
INVENTOR(S)       : Venkatasubramanian et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 66 days.

Signed and Sealed this
Thirty-first Day of January, 2023

*Katherine Kelly Vidal*

Katherine Kelly Vidal
*Director of the United States Patent and Trademark Office*